US011248838B2

(12) United States Patent
Zhou et al.

(10) Patent No.: US 11,248,838 B2
(45) Date of Patent: Feb. 15, 2022

(54) TRANSPORTABLE CONTAINER, CHARGER SYSTEM, METHOD AND KIT FOR GENERATION OF CARBON DIOXIDE SNOW BLOCK IN-SITU WITHIN THE TRANSPORTABLE CONTAINER FOR PRESERVATION OF ITEMS STORED THERE WITHIN

(71) Applicants: Ying Zhou, Naperville, IL (US); Ranko Bursae, Libertyville, IL (US); Robert R Sever, Northbrook, IL (US)

(72) Inventors: Ying Zhou, Naperville, IL (US); Ranko Bursae, Libertyville, IL (US); Robert R Sever, Northbrook, IL (US)

(73) Assignee: Praxair Technology, Inc., Danbury, CT (US)

( * ) Notice: Subject to any disclaimer, the term of this patent is extended or adjusted under 35 U.S.C. 154(b) by 66 days.

(21) Appl. No.: 16/895,688

(22) Filed: Jun. 8, 2020

(65) Prior Publication Data
US 2020/0300541 A1    Sep. 24, 2020

Related U.S. Application Data

(63) Continuation-in-part of application No. 15/645,152, filed on Jul. 10, 2017, now Pat. No. 10,712,072.
(Continued)

(51) Int. Cl.
*F25D 3/12* (2006.01)
*F25J 1/00* (2006.01)
*B65D 88/12* (2006.01)
*B65D 90/34* (2006.01)
*B65D 81/38* (2006.01)

(52) U.S. Cl.
CPC ........ *F25J 1/0027* (2013.01); *B65D 81/3818* (2013.01); *B65D 88/122* (2013.01); *B65D 90/34* (2013.01); *F25D 3/12* (2013.01); *F25J 2205/20* (2013.01)

(58) Field of Classification Search
CPC ......... F25D 3/12; F25J 1/0027; F25J 2205/20
See application file for complete search history.

(56) References Cited

U.S. PATENT DOCUMENTS

| 1,770,944 A | 7/1930 | Payson |
| 3,667,242 A | 6/1972 | Kilburn |

(Continued)

FOREIGN PATENT DOCUMENTS

| DE | 10129217 A1 | 1/2003 |
| EP | 0854334 A1 | 7/1998 |

(Continued)

*Primary Examiner* — Filip Zec
(74) *Attorney, Agent, or Firm* — Nilay S. Dalal

(57) ABSTRACT

This invention relates to a novel kit, transportable apparatus and method for generating in-situ CO2 snow block within the apparatus. An item such as a biological sample can be stored and transported within the same apparatus that is employed for creating the CO2 snow block. The apparatus is capable of preserving the sample during transport. The invention also includes a specially designed CO2 snow charger system including a charger and meshed conduit. The charger system is operated in accordance with the methods of the present invention to create the in-situ CO2 snow block within a container that can be also used for transport.

23 Claims, 10 Drawing Sheets

Related U.S. Application Data

(60) Provisional application No. 62/360,760, filed on Jul. 11, 2016.

(56) References Cited

U.S. PATENT DOCUMENTS

| | | | |
|---|---|---|---|
| 4,206,616 A | 6/1980 | Frank et al. | |
| 4,821,914 A | 4/1989 | Owen et al. | |
| 4,916,922 A | 4/1990 | Mullens | |
| 5,257,503 A | 11/1993 | Rhoades et al. | |
| 5,511,379 A | 4/1996 | Gibot et al. | |
| 5,528,907 A | 6/1996 | Pint et al. | |
| 5,548,974 A | 8/1996 | Rhoades | |
| 5,993,165 A | 11/1999 | Lorimer et al. | |
| 6,044,650 A | 4/2000 | Cook et al. | |
| 6,119,465 A | 9/2000 | Mullens et al. | |
| 6,209,341 B1 | 4/2001 | Benedetti et al. | |
| 6,209,343 B1 | 4/2001 | Owen | |
| 6,244,069 B1 * | 6/2001 | Hyde, Jr. | B30B 11/02 62/341 |
| 6,349,565 B1 * | 2/2002 | Greer | C01B 32/50 62/543 |
| 6,467,642 B2 | 10/2002 | Mullens et al. | |
| 6,584,802 B1 | 7/2003 | Cofield et al. | |
| 7,226,552 B2 | 6/2007 | Manini et al. | |
| 7,275,395 B1 | 10/2007 | Ventura | |
| 7,310,967 B2 | 12/2007 | Aragon | |
| 8,469,228 B2 | 6/2013 | Adams | |
| 8,516,849 B2 | 8/2013 | Mooijer et al. | |
| 8,869,551 B2 * | 10/2014 | Young | B30B 15/304 62/604 |
| 9,275,508 B1 | 3/2016 | Lavra et al. | |
| 2006/0045754 A1 | 3/2006 | Lukens | |
| 2007/0170201 A1 | 7/2007 | Steffens | |
| 2008/0083763 A1 | 4/2008 | Nielsen | |
| 2010/0293969 A1 | 11/2010 | Braithwaite et al. | |
| 2010/0299278 A1 | 11/2010 | Kriss et al. | |
| 2016/0260161 A1 | 9/2016 | Atchley et al. | |
| 2016/0334062 A1 | 11/2016 | Kermaidic et al. | |
| 2017/0146277 A1 | 5/2017 | Newman et al. | |
| 2019/0185327 A1 | 6/2019 | Zhou et al. | |

FOREIGN PATENT DOCUMENTS

| | | |
|---|---|---|
| EP | 2873937 A1 | 5/2015 |
| EP | 2881646 A1 | 6/2015 |
| EP | 3032195 A1 | 6/2016 |
| EP | 3173715 A1 | 5/2017 |
| GB | 2030277 A | 4/1980 |
| JP | H0926244 A1 | 1/1997 |
| JP | H09170860 A | 6/1997 |
| JP | H11130187 A | 5/1999 |
| JP | 3029950 B2 | 4/2000 |
| WO | 20110076701 A1 | 6/2011 |
| WO | 2014006281 A1 | 1/2014 |
| WO | 2015082704 A1 | 6/2015 |

* cited by examiner

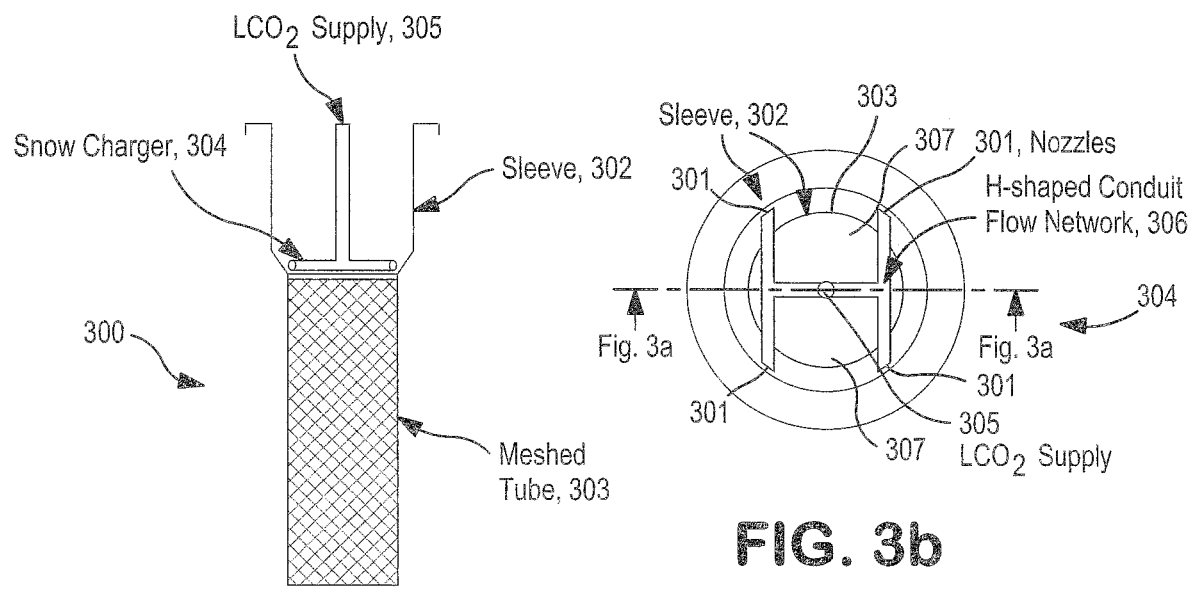
FIG. 3a
FIG. 3b
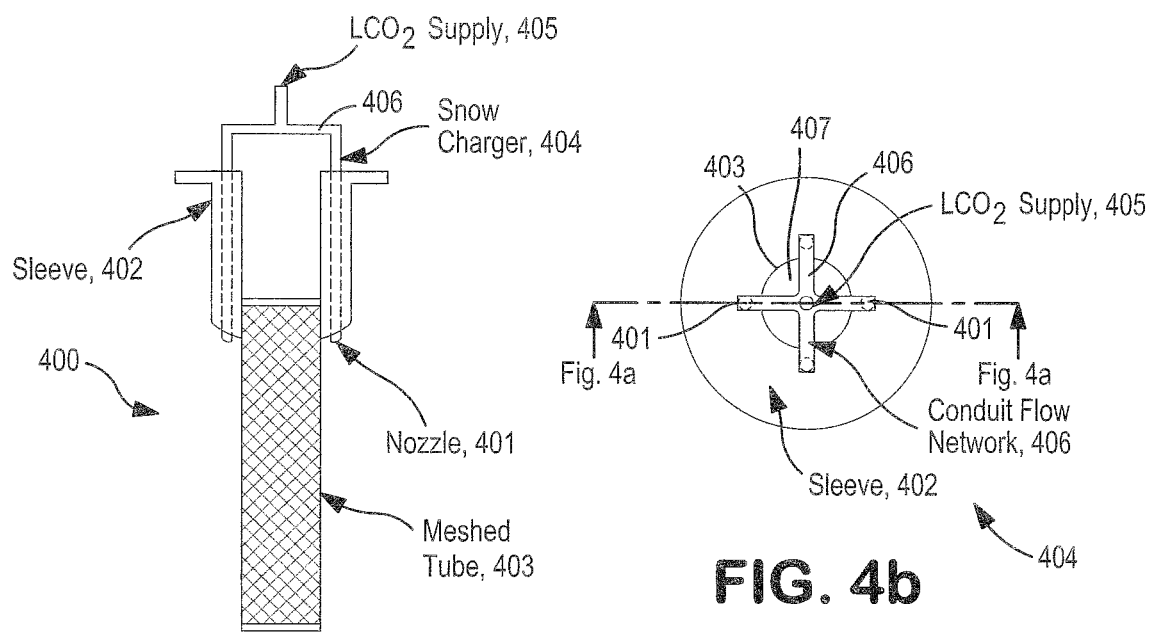
FIG. 4a
FIG. 4b

TRANSPORTABLE CONTAINER, CHARGER SYSTEM, METHOD AND KIT FOR GENERATION OF CARBON DIOXIDE SNOW BLOCK IN-SITU WITHIN THE TRANSPORTABLE CONTAINER FOR PRESERVATION OF ITEMS STORED THERE WITHIN

RELATED APPLICATIONS

The present application is a continuation-in-part of U.S. application Ser. No. 15/645,152, filed on Jul. 10, 2017, which claims priority from U.S. Provisional Application Ser. No. 62/360,760, filed Jul. 11, 2016, each of which is incorporated by reference herein in their respective entireties.

FIELD OF INVENTION

This invention relates to a unique apparatus, charger system, method and kit for in-situ generation of carbon dioxide (hereinafter referred to as "CO2") snow in block form within a container that can be used for preservation and transport of various items, including biological specimens.

BACKGROUND OF THE INVENTION

Drug development continues to be a major endeavor in the pharmaceutical industry. Drug development requires clinical trials to establish the safety and efficacy of new treatments. Today, in the United States, alone, there are a large number of on-going clinical trials in various stages. Each clinical trial can involve hundreds to thousands of patients who have volunteered to the administering of certain experimental drugs. Generally speaking, as part of the clinical trial, biological samples (e.g., tissue, urine, blood samples) are collected from participants at a clinical site, such as a hospital, university, or physician office, and then transported to laboratories for analysis or to facilities where they may be stored frozen for analysis at a later time.

The ability to evaluate the safety and efficacy of an experimental drug requires obtaining reproducible and reliable results during the clinical trials. The biological samples must be stabilized and preserved during storage and transport between, by way of example, the clinic and the laboratory. A common means to preserve biological samples today is to freeze and store them in the presence of solid carbon dioxide (i.e., dry ice).

Dry ice systems typically involve manually loading the samples and dry ice into an insulated box, such as a polystyrene box, at the clinical site where the samples are acquired. The insulated box is typically provided to the clinical site by a pharmaceutical company or contract research organization administering the clinical trial. The insulated box components may be provided in an assembled or disassembled state. Assembly of the insulated box and loading of the dry ice can be labor intensive. There may also be considerable cost and inconvenience associated with maintaining a sufficient supply of dry ice at the clinical site. Additionally, the failure to use such dry ice within a certain duration can cause the dry ice to lose its cooling effect. Further, the insulated box is typically not reusable and must be discarded, thereby creating waste.

Other drawbacks also exist with the transport of samples in conventional insulated boxes. The dry ice cools the interior of the insulated box as it sublimates to carbon dioxide vapor. A number of insulated boxes are available that can maintain a cold interior temperature for various durations up to four or five days. The interior sample space may be uniformly near dry ice temperature upon initial full dry ice loading, but as the dry ice sublimates, significant temperature gradients can arise within the interior sample space, potentially compromising sample quality. The insulated boxes are generally shipped via expedited delivery methods to ensure a sufficiently cold temperature is maintained within the interior sample space. However, should delays or disruptions occur in the shipping lanes, the samples can degrade. As a result of such delays during shipment, additional dry ice may be required to be loaded into the box during transit, which results in increased cost and logistical complexity to the shipment.

One alternative to conventional dry ice shippers is a cryogenic liquid nitrogen-based vapor vessel. Cryogenic liquid nitrogen-based vapor vessels utilize an absorbent to retain the cold nitrogen in the vapor state and avoid the presence of nitrogen in its liquid form. However, such liquid nitrogen-based vapor vessels suffer from drawbacks. One drawback is the time and labor involved in the preparation of the vessel. Specifically, users prepare such vessels by pouring liquid nitrogen into the vessel; waiting several hours to allow for sufficient absorption of the nitrogen onto the absorbent to occur; followed by decanting the excess liquid nitrogen prior to shipment. Substantial handling of the cryogenic liquid nitrogen is necessary, and significant time is required to prepare the liquid nitrogen shipper prior to its usage. Further, the costs associated with the use of liquid nitrogen-based vapor vessels are significantly higher than alternative dry ice vessels.

In view of these drawbacks, there is an unmet need for an improved way for preserving samples into a container during storage and transport.

SUMMARY OF THE INVENTION

In one aspect, a carbon dioxide (CO2) snow-making kit for charging CO2 and generating CO2 snow block in-situ within a container, comprising: a container comprising an interior volume defined by an internal meshed conduit volume, and a snow chamber into which CO2 snow block is configured to be generated and stored, said interior volume further surrounded by multiple container walls; the internal meshed conduit volume configured to receive a meshed conduit; said meshed conduit comprising porous openings sufficient for gas to pass through, but for the CO2 snow block to remain substantially within the snow chamber; and a CO2 snow charger operably or integrally connected to or penetrated through the meshed conduit, the CO2 snow charger configured to selectively direct CO2 fluid into the snow chamber, the snow charger further comprising one or more openings in fluid communication with the snow chamber.

In a second aspect, a method for in-situ charging carbon dioxide (CO2) snow block within a container, comprising the steps of: supplying CO2 fluid into a CO2 snow charger operably or integrally connected to a meshed conduit, said mesh conduit located within an interior of the container; selectively directing the CO2 fluid into a snow chamber; generating in-situ CO2 snow particles and gas in the snow chamber; and passing the gas through the meshed conduit.

In a third aspect a method for assembling a carbon dioxide (CO2) snow charging system at a site for in-situ generation of CO2 snow block in a container, comprising: providing a CO2 source; providing a container, the container further comprising an internal product volume and a snow chamber;

providing a meshed conduit; inserting the meshed conduit into the container; providing a CO2 snow charger; operably connecting or penetrating a first end of the CO2 snow charger to or through the meshed conduit; configuring the CO2 snow charger to direct CO2 fluid into the snow chamber, but not the internal product volume; and operably connecting a second end of the CO2 snow charger to the CO2 source.

In a fourth aspect, a carbon dioxide (CO2) snow charger system adapted to produce CO2 snow block in a snow chamber, comprising: a meshed conduit, said meshed conduit comprising porous openings sufficient for CO2 off-gas to pass through the porous openings, but substantially block particles of the CO2 snow block; and a CO2 snow charger operably or integrally connected to or penetrated through the meshed conduit, said CO2 snow charger configured to selectively direct CO2 fluid into the snow chamber.

In a fifth aspect, an apparatus configured for storing, preserving or transporting one or more items, comprising: a container characterized by an interior volume comprising a first region and a second region, wherein the first region is an internal product storage volume, and the second region is a snow chamber into which CO2 snow is stored, said container further comprising multiple insulated container walls at least partially surrounding the first region and the second region; a meshed conduit or a product holder located within the interior container volume; wherein substantially all of the CO2 snow is adapted to occupy the snow chamber, whereby said CO2 snow is confined within the snow chamber; the internal product storage volume separate and distinct from said snow chamber, the internal product storage volume adapted to receive one or more items for storage, preservation and/or transport.

BRIEF DESCRIPTION OF THE DRAWINGS

FIG. 1b shows a top view of a CO2 snow charger used in the kit of FIG. 1a;

FIG. 3a shows an alternative CO2 snow charging system in cross-sectional view taken along line 3a-3a of FIG. 3b, with the snow charging system having a H-shaped conduit flow network;

FIG. 3b shows a top view of a snow charger used in the CO2 snow charging system of FIG. 3a;

FIG. 4a shows an alternative CO2 snow charging system in cross-sectional view taken along line 4a-4a of FIG. 4b, with the snow charging system having a cross-shaped conduit flow network;

FIG. 4b shows a top view of a CO2 snow charger used in the CO2 snow charging system of FIG. 4a;

DETAILED DESCRIPTION OF THE INVENTION

Figure 1A:
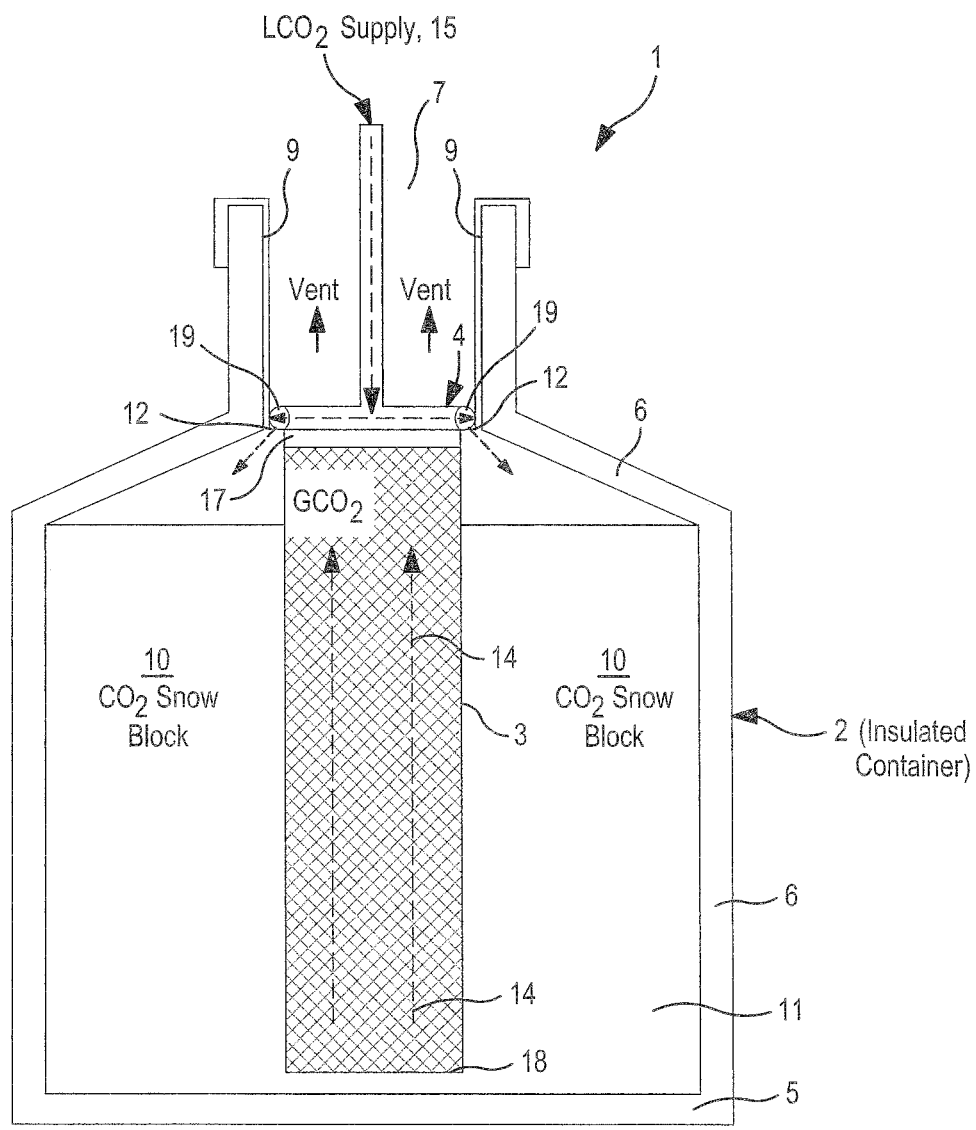
FIG. 1a shows a cross-sectional view taken along line 1a-1a of FIG. 1b showing a kit for charging CO2 snow within a shipper.

As will be described, in one aspect, the present invention offers a system and method for generating an in-situ CO2 snow block from a CO2 source directly within a specially designed transportable container using a charging system, which is preferably automated. As such, no transfer of CO2 snow block or dry ice from a separate production container to the transportable container is required, thereby reducing the labor required for loading CO2 snow block or dry ice into a cryogenic shipper. The on-demand generation eliminates the need for a user to maintain an inventory of CO2 snow block or dry ice on-site. The automation of the process simplifies operation, thereby allowing any user to utilize the system. While the present invention can be used with any "item" as defined herein below, in a preferred embodiment, the present invention is especially conducive for maintaining compliance with the packaging protocols required to reproducibly preserve the biological samples, thereby avoiding sample degradation and allowing the samples to revert back to its functional state and be subject to applicable testing upon arrival to its destination site. Further, the in-situ CO2 snow block is preferably generated with improved packing density that can hold the requisite temperature of the container with extended cooling effect duration in comparison to standard dry ice shipping containers containing CO2 dry ice produced by conventional techniques. The extended cooling effect duration can reduce the risk of sample degradation in transport and allow the user more flexibility to optimize cost and convenience regarding preparation and assembly of transportable containers of the present invention; when items (including samples, such as biological samples) are acquired; and the types of shipping methods that can be utilized.

It should be understood that the term "CO2 snow" and "dry ice" have the same meaning and may be used interchangeably herein and throughout to mean particles of solidified CO2.

"CO2 snow block" or "CO2 block," both of which may be used interchangeably herein and throughout, are intended to mean the creation of CO2 snow particles in a substantially block-like form of any shape consisting of tightly held-particles.

"CO2 fluid" as used herein means any phase including, a liquid phase, gaseous phase, vapor phase, supercritical phase, or any combination thereof.

"CO2 source" or "CO2 liquid source" as used herein includes, but is not limited to, cylinders, dewars, bottles, and bulk or microbulk tanks.

"Conduit" or "conduit flow network" as used herein means tube, pipe, hose, manifold and any other suitable structure that is sufficient to create one or more flow paths and/or allow the passage of a fluid.

"Connected" or "operably connected" as used herein means a direct or indirect connection between two or more components by way of conventional piping and assembly, including, but not limited to valves and conduit, unless specified otherwise, so as to enable fluid, mechanical, chemical and/or electrical communication between the two or more components.

"Item" as used herein means any temperature-sensitive goods, products or supplies which may be susceptible to spoilage, degradation, and/or structural alteration or modification if not maintained frozen or below a certain temperature, including, but not limited to, biological samples, such as blood, urine and tissue samples or their constituents; perishable foods, such as meat, poultry, fish and dairy products; personal care items; and chemicals.

"Charging" as used herein means the process of introducing $CO_2$ fluid from an external $CO_2$ source into a container operably connected to the external $CO_2$ source.

"Transportable" means an apparatus that is capable of being moved, transported or shipped from a user location to another destination by any known means, including, but not limited to, air, ground or water. The transport or shipping can occur through various packaged delivery services, including, but not limited to, parcel post, UPS® shipping services, FedEx® shipping services and the like.

The embodiments as described below are by way of example only, and the invention is not limited to the embodiments illustrated in the drawings. It should also be understood that the drawings are not to scale and in certain instances details have been omitted, which are not necessary for an understanding of the embodiments, such as conventional details of fabrication and assembly.

The embodiments are described with reference to the drawings in which similar elements are referred to by like numerals. The relationship and functioning of the various elements of the embodiments are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

In one aspect of the present invention, FIG. 1*a* shows a preferred $CO_2$ snow-making kit 1 for charging $CO_2$ fluid and generating $CO_2$ snow block in-situ within a transportable container 2. The kit 1 includes the container 2, which is preferably transportable, a meshed conduit 3 and a $CO_2$ snow charger 4. The transportable container 2 preferably includes multiple walls, preferably insulated along a substantial portion thereof with an insulated bottom wall 5, insulated side walls 6 and insulated top cover that is situated over the container opening 7 during transport of the container 2. Preferably, the walls 5 and 6 are vacuum-insulated to a particular level. The container 2 is preferably cylindrical shaped to enhance the ability to create an improved vacuum within the walls 5 and 6. A suitable getter material that is compatible with $CO_2$ snow or $CO_2$ snow block may occupy the space within the vacuum-insulated walls 5 and/or 6. The getter material by virtue of its sorption capacity acts as a pump to enhance the vacuum levels within the walls 5 and/or 6. The container 2 has an opening 7 into which meshed conduit 3 can be inserted when assembling the kit 1. The bottom section of the snow charger 4 is connected (e.g., via welding, mechanical fastening means and the like) to the first end 17 of the meshed conduit 3 and creates a seal at the point of attachment. Alternatively, the snow charger 4 and the meshed conduit 3 can be integrally connected by being manufactured as a single charging component.

The transportable container 2 includes an interior volume that can be classified into a first region and second region. The first region is an internal meshed conduit volume into which the meshed conduit 3 can be located. The meshed conduit volume can be any suitable volume. In one example, the meshed conduit volume is about 25 L or more, preferably up to about 10 L and more preferably up to about 3 L. In another embodiment, the meshed conduit volume ranges from 0.25-25 L, preferably 0.25-10 L and more preferably 0.25-1 L. The second region is a snow chamber 11 into which $CO_2$ snow block 10 is generated and stored. The snow chamber 11 preferably surrounds the meshed conduit 3, and the snow chamber 11 is completely or substantially insulated along all sides of the container 2. It should be understood that a relatively small portion of the insulated walls 5 and/or 6 may be removed to create an opening 7 so as to ensure proper $CO_2$ fluid charging and sample loading as will be described herein below.

The meshed conduit 3 includes an internal passageway 14. The meshed conduit 3 is preferably tubular, but it should be understood that other shapes are contemplated. The meshed conduit 3 is inserted through the opening 7 of the container 2 and extends into the internal meshed conduit volume of the container 2. The meshed conduit has a first end 17 and second end 18. The first end 17 is oriented at the opening 7 of the container 2, and the second end 18 is preferably oriented towards the vacuum-insulated bottom wall 5. In a preferred embodiment, the mesh conduit 3, when inserted within the container 2, is symmetrically disposed along a central longitudinal axis of the container 2 so as to create substantially uniform spacing between the outer surface of the meshed conduit 3 and the vacuum-insulated side walls 6, thereby creating a symmetrical annular snow chamber 11 that allows the $CO_2$ snow block 10 to be produced within the chamber 11 as a symmetrical annular substantially block form.

Figure 2:
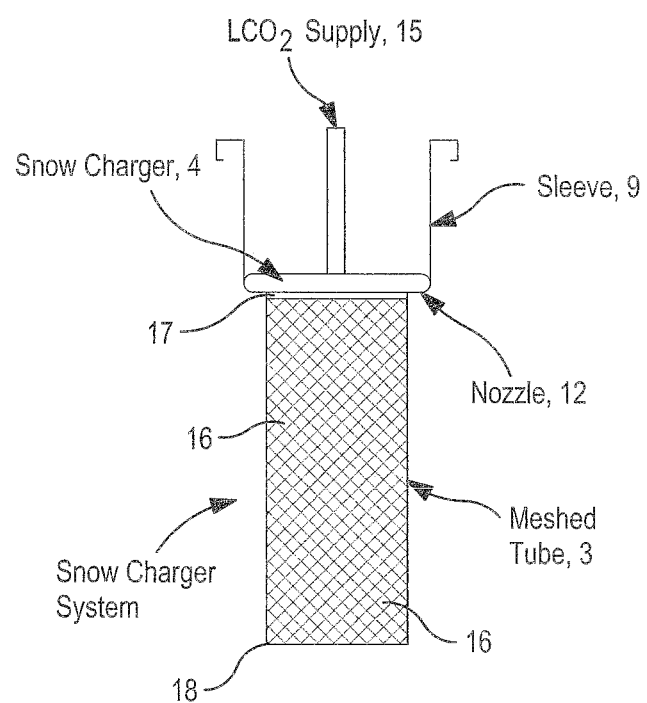
FIG. 2 shows the CO2 snow charger system, including a meshed conduit and CO2 snow charger.

The meshed conduit 3 comprises certain openings 16 on the surface of the conduit 3, as more clearly seen in FIG. 2. The inventors have discovered that utilizing a mesh conduit 3 imparts resistance that contributes to the packing of the snow particles that are generated within the snow chamber 11 so as to create $CO_2$ snow block 10. The $CO_2$ snow block 10 can have higher packing density than would otherwise be produced without a meshed conduit 3 situated in the container 2. In one example, the $CO_2$ snow block 10 created with the mesh conduit 3 and methods of the present invention has a bulk density comparable to the bulk density of pelletized dry ice $CO_2$.

The openings 16 of the meshed conduit 3 allow $CO_2$ off-gas ("$GCO_2$" in FIG. 1*a*) that is produced from the generation of $CO_2$ snow particles to pass through the openings 16 and into the internal passageway 14 of the meshed conduit 3. Upon entering the internal passageway 14, the $CO_2$ off-gas can flow therealong as indicated by the upward arrows in FIG. 1*a*, and then flow through one or more openings 13 (FIG. 1*b*) of the snow charger 4 to exit the container 2. The $CO_2$ off-gas can then be exhausted into a ventilation system that may be connected to the container 2.

The snow chamber 11 surrounds an exterior of the meshed conduit 3. Contrary to cryogenic liquid nitrogen shippers, the snow chamber 11 is characterized by the absence of foam-filed material or absorbent. The snow chamber 11 is surrounded by the vacuum-insulated bottom wall 5 and the vacuum-insulated side walls 6.

Figure 1B:
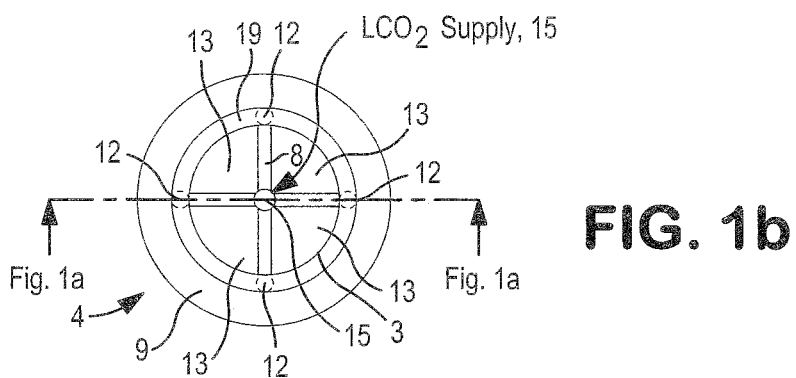

A top view of the snow charger 4 corresponding to FIG. 1a is shown in FIG. 1b. The snow charger 4 includes a cross-shaped conduit flow network 8; a ring tube 19 with nozzles 12 distributed along the ring tube 19 whereby the ring tube 19 extends along the edge of the network 8; and an outer sleeve 9 surrounding the ring tube 19. A central opening 15 is provided into which $CO_2$ fluid enters from a $CO_2$ supply source. Four nozzles 12 are uniformly distributed along the ring tube 19 of the cross-shaped conduit flow network 8 to ensure uniform injection of the $CO_2$ fluid into the snow chamber 11. Conduit flow network 8 is connected to the ring tube 19. Each nozzle 12 is spaced apart from the other by approximately 90 degrees, and each nozzle 12 has the same sized opening. The conduit flow network 8 creates a symmetrical cross-shaped structure that creates uniform openings 13 for $CO_2$ off-gas to vent through from the internal passageway 14 of the meshed conduit 3. The structure of such a charger 4 creates a substantially uniform flow of $CO_2$ fluid through the nozzles 12 which creates substantially uniform formation and distribution of $CO_2$ snow block 10 within the chamber 11. The introduction of $CO_2$ fluid into the snow charger 4 is indicated by the downward dotted lines of FIG. 1a extending towards central opening 15, and the distribution of $CO_2$ fluid within the conduit flow network 8 is indicated by the lateral dotted lines of FIG. 1a extending towards nozzles 12. Introduction of the $CO_2$ fluid from the nozzle 12 is indicated by angled downward arrows into the snow chamber 11. In one example, referring to FIG. 1a, the nozzles 12 can be oriented away from a vertical wall of the meshed conduit at an angle ranging from approximately 30° to 60° relative to the vertical wall, whereby the vertical wall extends perpendicular to a horizontal surface of the container 2. Other angular configurations of the nozzles 12 are contemplated. The flow path of $CO_2$ off-gas is indicated by the upward dotted lines of FIG. 1a, designated as "$GCO_2$", within the internal passageway 14 of the meshed conduit 3.

It should be understood the present invention contemplates other shapes of the nozzles 12, central opening 15 and conduit flow network 8; other geometrical patterns for the conduit flow network 8 (e.g., H-shaped or T-shaped); and other distribution and location of the nozzles 12 along the conduit flow network 8. By way of example, FIGS. 3a and 3b show an alternative snow charging system 300 that is compatible with the container 2 of FIG. 1a and FIG. 1b. The system 300 includes a meshed conduit or tube 303 and a snow charger 304. The snow charger 304 has an H-shaped conduit flow network 306. Nozzles 301 are located along the tapered portion where the sleeve 302 and H-shaped conduit flow network 306 connect, as shown in FIGS. 3a and 3b. The central opening 305 of the H-shaped conduit flow network 306 can receive a supply of $CO_2$ fluid from a $CO_2$ source. The $CO_2$ fluid is then directed through the H-shaped conduit flow network 306 into nozzles 301, which directs the $CO_2$ fluid into the snow chamber 11 angled towards the insulated wall 6 while substantially avoiding introduction of the $CO_2$ fluid into the meshed tube 303. The $CO_2$ fluid preferably enters into the snow chamber 11 as a liquid.

The openings 307 are in fluid communication with the internal passageway of the meshed tube 303 to allow $CO_2$ off-gas generated from the in-situ snow block 10 to be exhausted therethrough. The snow charging system 300 can be inserted into a preferably cylindrical-shaped container, such as container 2 of FIG. 1a, to form a kit suitable for producing in-situ snow block within the cylindrical shaped container.

FIGS. 4a and 4b show an alternative snow charging system 400 which is also compatible with the container 2 of FIG. 1a and FIG. 1b. The system 400 includes a different design of the conduit flow network 406 and sleeve 402. Sleeve 402 on the snow charger 404 is designed to conform to the shape of the container 2. Similar to the other charging systems of the present invention, sleeve 402 provides a sufficient seal during the $CO_2$ snow charging operation. The sealing effect of the sleeve 402 prevents the $CO_2$ off-gas from exiting the container 2 other than through the openings 407 of the snow charger 404. FIG. 4a shows that the $CO_2$ fluid inlet conduit (i.e., flow network conduit 406) passes through the sleeve 402. Nozzles 401 are configured at the tips of the conduit flow network 406 and can open at a certain direction as needed to inject $CO_2$ fluid into the snow chamber 11 of container 2. The $CO_2$ fluid enters aperture 405, preferably in liquid phase, and then laterally flows to each side of the conduit flow network 406. Next, the $CO_2$ fluid flows downward along conduit flow network 406 where it flows through nozzles 401, situated along the side of the mesh tube 403, and then into the snow chamber 11 of a container 2. FIG. 4a shows that the side portion of the meshed conduit 403 is attached to the sleeve 402. The snow charging system 400 can be inserted into a container, such as a cylindrical-shaped container 2 of FIG. 1a, to form a kit 1 that can produce an in-situ $CO_2$ snow block within the cylindrical-shaped container 2 in accordance with the principles of the present invention.

As can be seen, conduit flow networks 306 and 406 represent different structural configurations intended to achieve specific flow patterns of $CO_2$ fluid therethrough that is directed into the snow chamber 11 of the container 2. It should be understood that the snow charging systems of the present invention, including charging system 300 and charging system 400, can be utilized with other containers besides the container 2 of FIG. 1a.

The exact selection of geometry and overall design of the charger such as that shown with the designs of charger 4, charger 304 and charger 404 may be dependent upon several design factors including, but not limited to, the interior volume (i.e., volume of meshed conduit 3 and/or volume of snow chamber 11) of the container 2 and the amount of $CO_2$ snow block 10 required to be generated to maintain storage of an item, such as a biological sample, that is preserved during transport to be maintained at a temperature no warmer than a pre-defined temperature for a certain duration (e.g., no warmer than −60° C. for approximately 4 days).

Referring to FIGS. 1a, 1b and 2, the effective diameter of the snow charger 4 is shown to be wider than that of the meshed conduit 3 to ensure the nozzles 12, which are positioned along the edge or periphery of the conduit flow network 8, introduce $CO_2$ fluid outside of the meshed conduit 3 and into the snow chamber 11 while substantially avoiding injection of $CO_2$ fluid into the internal passageway 14 of the meshed conduit 3. A substantial portion of the $CO_2$ snow particles which are formed in the snow chamber 11 do not pass into the internal passageway 14. The internal passageway 14 is designed to only allow a passageway for the $CO_2$ off-gas generated during formation of the $CO_2$ snow block 10 to flow therethrough so the $CO_2$ off-gas can be removed from the transportable container 2. In this regard, the angled arrows into the snow chamber 11 of FIG. 1a are intended to designate the location of the nozzles 12 and the corresponding introduction of CO2 fluid through the nozzles 12 and into the snow chamber 11.

Still referring to FIGS. 1*a*, 1*b* and 2, the sleeve 9 extends around the conduit flow network 8. The sleeve 9 further extends away from the snow charger 4, as shown in FIG. 1*a*, and can attach to the container 2 by any suitable means, thereby securing the charger 4 and meshed conduit 3 in stationary position during operation of the kit 1. In one example, as shown in FIG. 1*a*, the sleeve 9, which is part of the charger 4, vertically extends away from the top of the charger 4 and attaches along the top section of the container 2. The sleeve 9 can impart structural reinforcement to the mesh conduit 3. The ability to reinforce the mesh conduit 3 allows the mesh conduit 3 to impart more resistance against the CO2 snow block 10 that is forming and accumulating in the snow chamber 11. As a result, the present invention can offer the benefit of in-situ production of denser CO2 snow block 10 and increased loading capacity of the CO2 snow block 10 in the snow chamber 11 in comparison to CO2 snow created in a container without a mesh conduit.

The sleeve 9 also serves as a seal that prevents the CO2 off-gas from exiting the container 2 other than through the openings 13 of the snow charger 4. The venting of CO2 off-gas through the openings 13 can only occur when CO2 off-gas is flowing within the internal passageway 14 of the meshed conduit 3. As such, the sleeve 9 forces the CO2 off-gas in the snow chamber 11 to pass through openings 16 of the mesh conduit 3, located along the surface of the meshed conduit 3; followed by entry into the internal passageway 14 of mesh conduit 3; and then exit through openings 13 of the snow charger 4. It should be understood that other means for sealing can be carried out by the present invention. For example, referring to the charger system 400 of FIG. 4*a*, sealing can occur at a bottom portion of sleeve 402 that extends along the outer surface of the conduit 403, thereby creating a seal between the sleeve 402 and the neck portion of the container 2.

Figure 5:
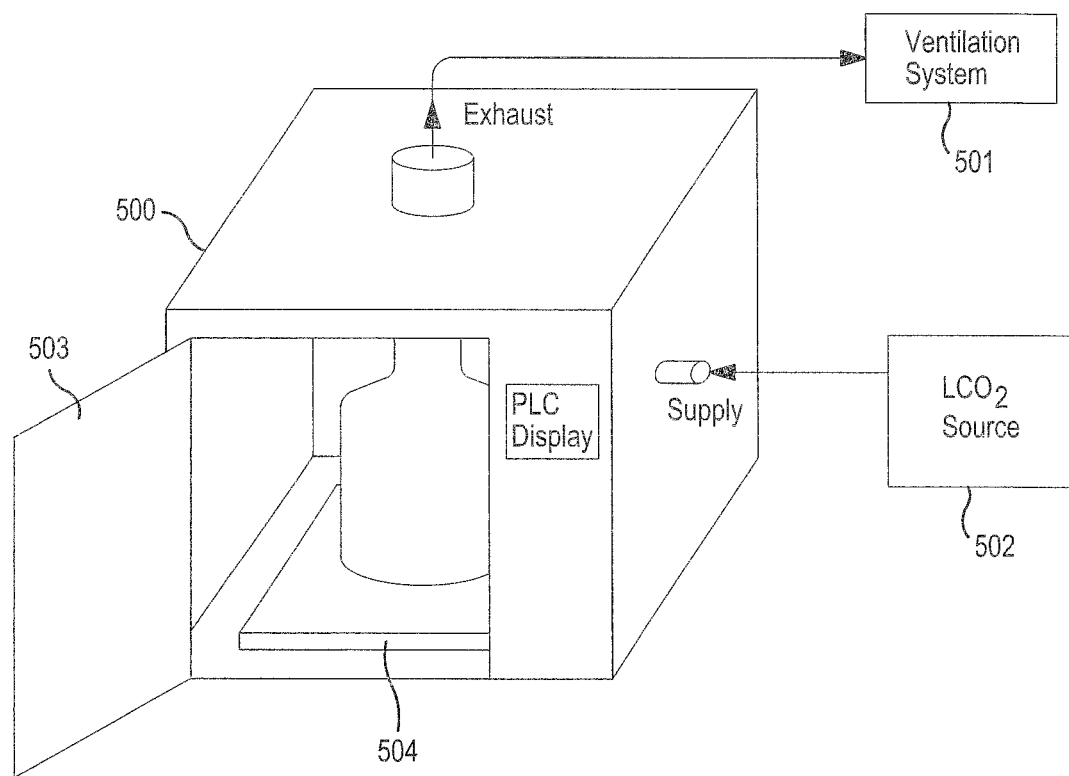
FIG. 5 shows a representative CO2 charging station in perspective view with the transportable container assembled and connected to a ventilation system and a liquid CO2 source.

Having described the structural components and the assembly of the CO2 snow-making kit 1, one aspect of the present invention for the method of charging and making the CO2 snow block 10 within the transportable container 2 will now be discussed with reference to FIGS. 1*a*, 1*b*, 2 and 5. The assembled CO2 snow-making kit 1 as shown in FIG. 1*a* is placed into a charging station 500 on a weight scale 504, as shown in FIG. 5. Although not shown, a programmable logic controller (PLC) is preferably integrated with the weight scale 504 to control the amount of CO2 fluid that is introduced into the kit 1. A PLC display allows the user to monitor the charging process. The PLC display preferably also indicates when the charging is completed.

Pressure regulating devices; pressure transmitters; control valves and manual valves may be configured as part of the charging process for the delivery of CO2 fluid into the kit 1. It should be understood that the exact conduit and valving configuration is not drawn to scale and certain features are intentionally omitted to better illustrate the charging process utilizing the kit 1.

The outlet of the CO2 snow-making kit 1 has openings 13 (i.e., vent openings) in the snow charger 4. The openings 13 can be connected with suitable conduit into a ventilation system 501 which captures the CO2 off-gas created during generation of in-situ CO2 snow block 10 within the snow chamber 11. The venting removes CO2 off-gas generated from the CO2 snow process, thereby providing a safe operating environment. Additionally, a pressure relief valve can be installed on sleeve 9 or in close proximity thereto. The inlet to the kit 1 is through the central opening 15 of conduit flow network 8 and is operably connected to a CO2 source 502, which generally will store the CO2 fluid at a pressure of 300-900 psig. The CO2 source 502 may comprise any suitable container as defined hereinbefore, including, but not limited to, cylinders, dewars, bottles, or microbulk or bulk tanks. The CO2 source 502 may be equipped with safety regulating features, such as safety valves and burst discs. A conduit extends from the CO2 source 502 into the central opening 15 of conduit flow network 8 of snow charger 4.

When ready to begin CO2 charging, the door 503 of the charging station 500 is closed. Safety interlocks are provided in the charging station 500 so that the door 503 remains locked during CO2 charging. The ventilation system 501 is turned on.

A button on the charging station 500 can be pressed to activate the charging process. Pressurized CO2 fluid is introduced from the CO2 source 502 into the conduit that operably connects the source 502 to container 2. Preferably, the CO2 fluid is CO2 liquid, and CO2 gas is added into the conduit to prevent the pressure of the liquid CO2 from reducing below a certain pressure (e.g., about 150 psig) to ensure the liquid CO2 does not prematurely undergo a phase change to solid and gas within the conduit.

The CO2 fluid is directed into the snow charger 4 at central opening 15 of conduit flow network 8, as indicated by the downward dotted arrow lines of FIG. 1*a*. Thereafter, the CO2 fluid is uniformly distributed within the conduit flow network 8 towards each of four nozzles 12, as indicated in FIG. 1*a* by the horizontal dotted lines within the snow charger 4. The four nozzles 12 are angled to direct or inject the CO2 fluid into the snow chamber 11 and towards the vacuum-insulated side walls 6 while substantially avoiding injection into the internal passageway 14 of the mesh conduit 3. In the preferred embodiment, the snow chamber 11 represents an annular region between the meshed conduit 3 and the vacuum-insulated walls 6 of the container 2. Other designs are also contemplated where the snow chamber 11 has a non-annular shape that surrounds the meshed conduit 3. The CO2 fluid in liquid phase passes through the nozzles 12. A pressure and temperature drop occurs as the liquid CO2 passes through the nozzles 12 and into the snow chamber 11 to produce solid particles of CO2 snow block 10 and CO2 off-gas in the snow chamber 11.

The openings 16 of meshed conduit 3 are sized to allow passage of the CO2 off-gas, but substantially block entry of the particles of CO2 snow. Passage of the CO2 off-gas into the meshed conduit 3 and then through the openings 13 of snow charger 4 is the only pathway for removal of CO2 off-gas from container 2. As the CO2 off-gas flows into the meshed conduit 3, it has the desirable effect of packing the snow particles and forming and accumulating snow block 10 in the snow chamber 11. The term "packing" as used herein with reference to the charging method of operating the CO2 snow-making kit 1 refers to compression of the snow particles into a CO2 snow block 10. The packing in accordance with principles of the present invention impacts the amount of CO2 snow block 10 that can be generated in-situ in snow chamber 11 and loaded within the transportable container 2.

The present invention has the ability to utilize the formation of the CO2 off-gas to pack the snow block 10 before the CO2 off-gas exits the container 2 through the openings 13 on the snow charger 4. The CO2 off-gas flows upwards within the internal passageway 14 of the meshed conduit 3 (as indicated by the upward arrows in FIG. 1*a*) and emerges through openings 13 of the snow charger 4. The openings 13 are more clearly shown in the top view of FIG. 1b of the snow charger 4. As such, the internal passageway 14 serves as an exhaust passageway. The CO2 off-gas can then be directed into ventilation system 501 that is operably connected to the container 2.

During the formation and accumulation of CO2 snow block 10, CO2 off gas is produced in the snow chamber 11. The openings 16 of the meshed conduit are restricted in size and therefore prevent CO2 off-gas from freely flowing through openings 16 and into the internal passageway 14. Pressure is therefore created in the snow chamber 11. The mesh conduit 3 has sufficient structural rigidity to impart resistance and not undergo substantial deformation against the pressure in snow chamber 11. As such, the packing density of the CO2 snow block 10 can increase within the annular region of the snow chamber 11. The resultant CO2 snow block 10 resembles a substantially ring-like block form of tightly held snow particles. In one example, the bulk density of the CO2 snow block 10 ranges from 55-65 pounds per cubic ft. The bulk density of CO2 snow block 10 formed in the snow chamber 11 is related, at least in part, to the size of openings 16 of the meshed conduit 3. As CO2 snow block 10 continues to form and pack within the snow chamber 11, the CO2 off-gas continues to pass with resistance, (i.e., not freely flow), from the snow chamber 11 through openings 16 of the meshed conduit 3. The CO2 off-gas then flows through the internal passageway 14 and exits container 2 through openings 13 of the snow charger 4. As can be seen, the mesh conduit 3 (i) functions as a CO2 snow particles and gas separation barrier; (ii) provides resistance for packing the CO2 snow block 10; (iii) creates an annular region in the snow chamber 11 that holds and packs the resultant CO2 snow block 10 in a substantial stationary position during the charging operation; and (iv) prevents the CO2 snow block 10 from collapsing into the internal passageway.

The particles of CO2 snow continue to form within the snow chamber 11 in a block form, and the scale 504 continues to monitor the weight of the CO2 snow block 10 as the CO2 snow block 10 continues to form within the snow chamber 11. When a target set point weight of CO2 snow block 10 has been generated, the PLC automatically relays signals to appropriate control valves that shut off supply of liquid CO2 from the liquid CO2 source 502. Generally speaking, the set point weight of CO2 snow block 10 is defined as the weight of CO2 snow block 10 required to maintain the sample product holder space or meshed conduit 3 space below a certain critical threshold (i.e., pre-defined) temperature for a certain number of days, thereby ensuring that the item transported within the container 2 remains preserved and is usable upon arrival at the final destination. By way of example, when the item is a biological sample, the sample is usable for test purposes upon arrival at the destination site. Appropriate display regarding completion of the charge can be visually displayed at the charge station 500, and optional remote alert and notification to the user may be provided.

Upon completion of the charge, the PLC deactivates the safety interlocks to allow charging door 503 to be opened by the user. In this manner, the in-situ automated generation of CO2 snow block 10 with snow-making kit 1 avoids the need to handle dry ice pellets or blocks as well as the need to maintain an inventory of the dry ice pellets or blocks on-site. It should be understood that the charging process can also be manually shut-off when the set point weight of CO2 snow block 10 has been attained.

In another embodiment, the charging occurs until the CO2 snow block 10 is determined to fill to the top of the container 2 or approximately thereto; a pre-defined set point weight of snow block 10 may optionally be used to determine when the charging process should stop, but such pre-defined set point weight is not necessary in this particular method for charging the snow block 10 into container 2. Any detection means, some of which are described below, can be used to determine when the CO2 snow block 10 has filled to the top of the container 2 or approximately thereto.

As an alternative mode of operation, the automatic or manual shut off to the CO2 charging station 500 is not based on how much CO2 weight is added to container 2, but rather on the pressure created inside the snow storage area. Detecting a certain upper pressure level or pressure rise can be used to determine when to turn off supply from the liquid CO2 source. Other detection means for determining when the charge has been completed can be provided. For example, and not intending to be limiting, the charge can be manually or automatically shut-off upon reaching a certain time, temperature, and/or capacitance level in the container 2. As such, the present invention contemplates employing a pressure indicator, differential pressure, temperature sensor, timer, capacitance measurement or any combination thereof. It should be understood that completion of a charging method as described herein can mean when the snow block 10 has filled (i) to the top of the container 2; (ii) approximately to the top of the container 2 (e.g., within 80% or greater of a maximum volume capacity of the snow chamber 11); or (iii) to a certain pre-defined fraction of the maximum volume of the snow chamber 11 of the container 2.

In a preferred embodiment, a single and full charge of CO2 snow block 10 into container 2 is performed that is based on filling to a pre-defined weight of the CO2 snow block 10 until the CO2 snow block 10 has been determined to substantially fill the snow chamber 11. Alternatively, it should be understood that the single charge can be performed such that the CO2 snow block 10 occupies only a portion of the snow chamber 11. Additionally, it should be understood that any of the charging methods of the present invention can be based on any suitable detection means, including those described herein, and the charging can be employed one or more times to create a single dry ice block 10 or multiple dry ice blocks 10 that are stacked together in the container 2. Manual or automatic shut-off of a charge is contemplated with any of the charging methods and detection means for determining when the charge is complete.

In another aspect of the present invention, when the charging is based on monitoring the weight of dry ice block 10 to achieve a set point or pre-set weight of dry ice block 10 for a given insulated container 2 to be used for charging, an initial estimate for the required weight of CO2 snow block 10 required to be formed in the container 2 can be determined from Table 1 below, as will now be explained.

TABLE 1

| Formula | Q = ΔT*A/R | Units |
| --- | --- | --- |
| Heat gain into the container through the walls | Q | Btu/hr |
| Overall R value of the insulated container | R | $F*ft^2*hr/Btu$ |
| Surface area of the insulated container | A | $ft^2$ |
| Temperature difference | $\Delta T = T_{ext} - T_{ins}$ | F |
| Dry ice sublimation energy | 246 | Btu/lb |
| Transportation duration | t | hr |
| Dry ice weight | (Q*t)/246 | lb |
| Safety factor | α | 1 |

First, the heat gain into the container, preferably container 2, Q, is determined based on the formula indicated in Table 1. The R value as known in the art is the overall insulative property of the container, and A is the total surface of the insulated container 2 which is exposed to the environmental temperature, $T_{ext}$. The $T_{ext}$ is, on average, the environmental temperature that the container 2 is expected to be exposed to during transport. Both A and R are known properties of the container 2. The ΔT is an estimated value that is calculated as the temperature difference between the environmental temperature ($T_{ext}$) and the temperature inside the container ($T_{ins}$). $T_{ins}$ is the temperature that is measured inside the container 2. Preferably, a thermocouple is situated along or adjacent to the inside of the cover to measure $T_{ins}$ (e.g., the inside of top cover 600 of FIG. 6). The $T_{ext}$ can be modified or corrected with an optional adjustment factor, α, which can take into account the seasonal average variation between morning and afternoon temperatures. It should be understood that a more accurate estimate of ΔT may also be obtained with the use of internal and/or external temperature sensors as will be explained below. Having determined ΔT and with A and R known values, Q is calculated. Q represents, on average, the expected rate of heat gain through the insulated walls and cover of the given container 2 to be used for charging and subsequent transport of the items stored therewithin. Next, having determined Q, the estimated dry ice weight required for a given duration, t, that certain items within container 2 are expected to be transported therewithin can be determined. The estimated weight of dry ice block 10 is determined as (Q*t)/246 where 246 is the recognized sublimation energy needed for CO2 snow to undergo a phase transfer from the solid phase directly to the gas phase. This estimated weight of dry ice snow block 10 can be inputted into a PLC as the set point weight that governs when the completion of a charge is completed, or can be manually used as a set point weight during the charging process into the container 2. Upon detecting that the set point weight has been reached, the charge can be shut off, either manually or automatically.

The selection of various operating variables can impact the charging operation, and the method by which the CO2 snow block 10 is in-situ generated within the transportable container 2. For example, the liquid CO2 supply pressure and the design of snow charger 4 (e.g., size, number, angle, location and distribution of the nozzles 12) can affect the liquid CO2 flow rate, CO2 snow block 10 yield and off-gas flow rate out of the CO2 snow charger 4 as well as the distribution and packing of snow block 10 inside the snow chamber 11 and the required time to complete the charging operation. Further, the ability of the meshed conduit 3 to serve as a barrier for the snow and off-gas and impart sufficient resistance for packing of the snow block 10 can be governed, at least in part, by the size of the openings 16 of the mesh conduit 3 and the fraction of the surface of the mesh conduit 3 with openings 16. Still further, the combination of a certain liquid CO2 supply pressure and design of snow charger 4 can impact the ability of the charger 4 to continuously make in-situ snow block 10. Additionally, for certain applications, there may be an optimum CO2 off-gas flow rate to suitably compress the snow block 10 with sufficient density. The mechanism for such suitable compression can work with a range of liquid CO2 flow rates delivered through the nozzles 12 of the charger 4 and/or a range of CO2 off-gas flow rates exiting the container 2.

The exact selection of operating variables may vary on several factors, including the shape of the container 2 (e.g., cylindrical, polygonal, rectangular, or bottle-shaped); the vacuum-insulated properties or R value of the container 2; the endurance characteristic, which is an indicator of the duration or longevity that particular items in the container 2 can be maintained no warmer than a certain temperature; the particular item to be preserved during transport; and the amount of snow block 10 required to achieve the preservation of the particular item for a certain number of days during transport to a final destination for a user to handle, test and/or analyze the item. Preferably, the operating variables are selected to achieving optimal charging and endurance characteristics of the container 2.

Figure 6:
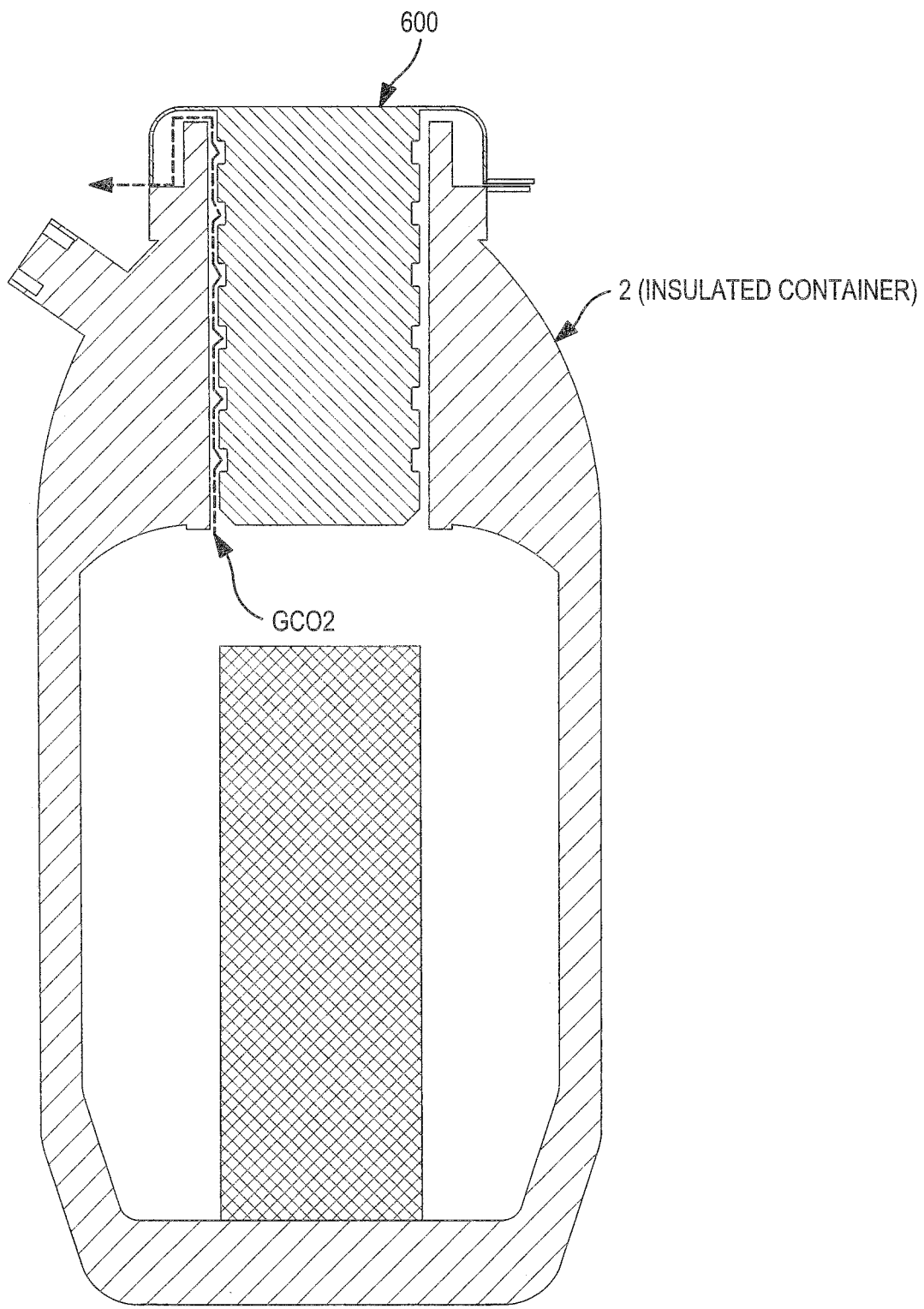
FIG. 6 shows a cross sectional view of a top cover with a mechanical seal inserted into the transportable container for use during transport of the item in the container and a meshed conduit inside of the container.

Having completed the charging operation of CO2 snow block 10 into container 2, the container 2 is disengaged from the CO2 source. Next, the snow charger 4 and meshed conduit 3 are then detached from the container 2, thereby allowing a user to have access to the interior volume of the container 2. Ventilation system 501 can remain on while detaching the charger 4 to ensure all CO2 off-gas is directed into the ventilation system 501. The item to be transported in container 2 is loaded into a product holder. The product holder is then inserted through the opening 7 of container 2 and occupies the same volume originally occupied by the meshed conduit 3. Alternatively, the product holder can be inserted into container 2 and then the item can be loaded into the product holder. Alternatively, the meshed conduit 3 can remain permanently affixed within the container 2 and the product holder can be inserted into the meshed conduit 3. FIG. 6 shows one example of the meshed conduit 3 inside of the container 2 along the bottom of the container 2. Other methods for attaching the meshed conduit 3 within the bottom of the container 2 or at other regions within container 2 are contemplated by the present invention. The transportable container 2 by virtue of having a meshed conduit 3 and a product holder prevents CO2 snow or CO2 snow block from collapsing into the sample region, which is a benefit not provided by conventional dry ice shippers not utilizing a product holder or meshed conduit 3.

Next, a top cover 600 with mechanical seal (e.g., cork-like structure as shown in FIG. 6) is inserted into opening 7 of container 2 to create confinement of the product holder and item therein during storage, preservation and/or shipping of the samples contained therein. The top cover 600 with mechanical seal contains a zigzag channel or passageway through which the CO2 off-gas can escape, thereby substantially reducing or eliminating pressure buildup of CO2 gas that is formed during storage, preservation and/or transport of items in the container 2. The spacing of the passageway is preferably optimized so as to minimize heat gain of the interior of container 2 from the atmosphere while allowing CO2 off gas venting to minimize pressure build-up in the container 2. Other channel designs which vent excess CO2 pressure while minimizing heat gain of the container 2 are contemplated.

At this juncture, the container 2 is configured for storage, preservation and transport of the items. As mentioned hereinbefore in accordance with the principles of the present invention, the endurance or performance of the charged container 2 can depend on several factors, including, but not limited to, the quantity of the CO2 snow block 10 that is charged inside the container 2, the size of the container 2, including the size of the space occupied by the product holder, and the R value or insulation of the container 2. The endurance of the container 2 as used hereinbefore can be characterized as the duration or longevity that particular items in the container 2 can be maintained no warmer than a certain temperature, such as, by way of example and not intending to be limiting, −60° C. The walls 6 of the container 2 are preferably vacuum insulated to provide sufficient thermal insulation. The level of vacuum insulation affects the R value such that greater vacuum insulated walls 6 results in higher R values of the container. In one embodiment, and as has been demonstrated and described by the tests carried out by the inventors in the Examples herein below, the calculated overall R value for the container 2 is approximately 18 ft^2 hr F/Btu at a vacuum level of about 1000 micron. In other words, at a vacuum of 1000 microns, a container having 10 lbs. of CO2 snow block therein made by the present invention will maintain samples or items therein at a temperature no warmer than about −60° C. for approximately 4 days. In another embodiment, the R value for the container is determined to be about 180 ft^2 hr F/Btu at a higher vacuum level of about 10 microns along the jacketed portion of the container 2. In other words, at a vacuum of 10 microns, a container having 10 lbs. of CO2 snow block therein made by the present invention will maintain samples or items therein at a temperature no warmer than about −60° C. for approximately 37 days.

Figure 7A:
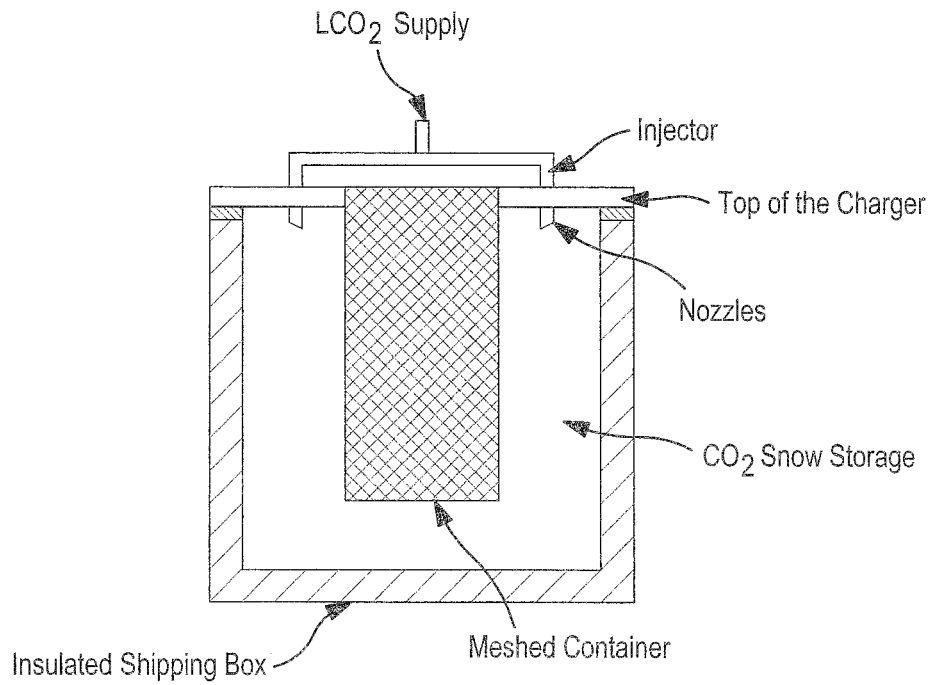
FIGS. 7a and 7b show an alternative design of a CO2 snow charger kit used to generate in-situ CO2 snow in a standard shipping box.
Figure 7B:
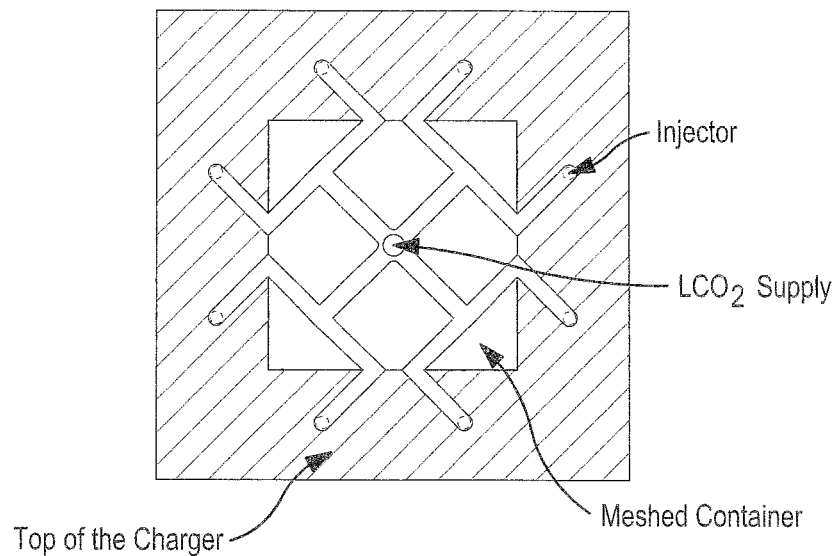

Other modifications of the present invention are contemplated. For example, it should be understood that the principles of the present invention as described herein are applicable to any type of container, including containers which are not transportable or which permanently or temporarily remain at a user site so that the container is employed to only produce CO2 snow block therewithin. For example, the CO2 snow charger 4 with meshed conduit 3 can be utilized to generate in-situ CO2 snow, preferably in block form, in a standard shipping box. In this regard FIGS. 7a and 7b show an alternative design of a CO2 snow charger system designed to generate in-situ CO2 snow block in a standard shipping box. The CO2 snow charger system includes a snow charger and meshed conduit. As described hereinbefore, the snow charger 4 is further defined by a conduit flow network that can be varied in geometry and design to create a suitable CO2 fluid injection pattern and CO2 fluid flow distribution into the standard shipping box. The conduit flow network can have multiple elongated structures of a predetermined shape and pattern with nozzles embedded therein.

Other variations to the CO2 snow charger besides that shown in FIGS. 1b and 2 are contemplated. For example, FIGS. 4a and 4b show the top portion of the meshed conduit 3 situated between the end portions of the sleeve 402 of the charger 400. The conduit flow network 402 extends within the sleeve 402.

Other design types for the chargers, nozzles and meshed conduits are contemplated. For example, different shaped meshed conduits can be employed other than a cylindrical shaped meshed conduit. In one example, a tapered meshed tube can be employed in which the top portion has a larger diameter than the bottom portion to facilitate insertion and removal of the meshed tube from the interior of the container 2. In another example, a charger kit can be utilized where a cylindrical meshed conduit is attached to an inverted u-shaped flow network conduit in which the bottom portion of the flow network is connected to a reservoir portion with triangular shaped cross section that extends along the outer surface of the meshed conduit. The nozzles are located along the triangular shaped portion and are designed to inject downward into the chamber while substantially avoiding introduction into the meshed conduit. Other designs combinations of the meshed conduit and the CO2 snow charger design are contemplated. Further, it should be understood that various other injection conduits or certain flow network conduits are contemplated by the present invention, besides the H-shaped conduit of FIG. 3b and cross shaped conduits shown in FIG. 1b and FIG. 4b, to carry out the charging methods of the present invention. Still further, alternative structures can be employed for sealing the snow charger to the container 2. For example, the sleeve of the snow charger can be flat so to mate and seal with a structure ring that is situated internally within the opening 7 of the container 2 at the top of the container 2.

The product holder can be non-porous or porous. In a preferred embodiment, a product holder is employed that is non-porous, disposable and able to create a sealed enclosure on along its sides around the item to be transported. The product holder is structurally configured so as to segregate the item being transported from the remainder of the interior spaces (i.e., the snow chamber 11) within the container 2. Many of the items shipped in container 2, including biological samples, can be held within their own primary packaging, such as blood that is typically confined within a sealed or capped glass vial or tube. Should a vial or tube rupture or break within the container 2, the product holder is designed to contain the biological sample, thereby preventing contamination of the interior of the container 2. In another embodiment, the meshed conduit 3 is removably detached from the snow charger 4 after completion of the charging and formation of in-situ CO2 snow block, and then remains in the container 2 to serve as the product holder. Alternatively, the meshed conduit 3 can be permanently situated within the container 2 and may serve as a porous product holder.

Figure 10:
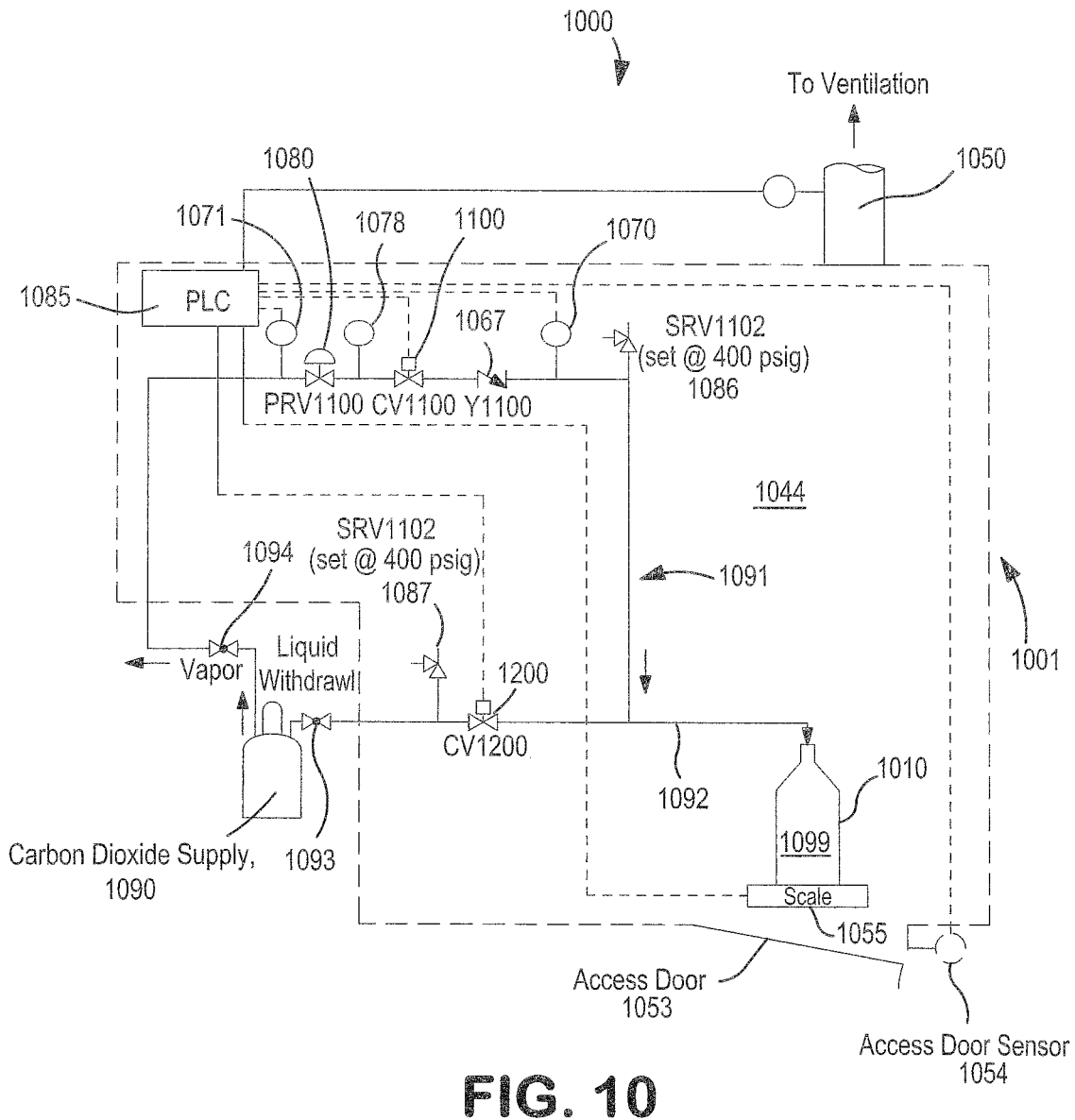
FIG. 10 shows a process flow schematic for introducing CO2 gas and CO2 liquid from a CO2 source into a transportable container, in accordance with the principles of the present invention.

Still further, the present invention contemplates improved methods for generating the in-situ CO2 block within the transportable container. One aspect of the present invention is shown in FIG. 10, which represents a generalized schematic for a process 1000 by which the packing density of the in-situ CO2 block can be enhanced. It should be understood that certain details from the process 1000 have been omitted and may not be drawn to scale. For example, the exact conduit and valving configuration is not drawn to scale and certain features are intentionally omitted to better illustrate the charging operation as shown in FIG. 10. Generally speaking, the process 1000 involves alternating the introduction of liquid CO2 with CO2 gas into the transportable container 1010 to improve packing density of the CO2 in-situ block 1099 formed within the transportable container 1010. Although not shown, the transportable container 1010 has the inventive features described hereinbefore, including a CO2 snow making kit that includes a charger and meshed conduit. The transportable container 1010 is shown situated within a charging station 1001. The container 1010 is introduced into the charging station 1001 by opening an access door 1053 which allows access to the charging station 1001. An access door sensor 1054 detects when the door 1053 is open and closed and can be designed to prevent introduction of CO2 fluid into the container 1010 when the door 1053 is open. The container 1010 is placed on a weigh scale 1055, and then the access door 1053 is closed.

An exhaust system is operably connected to the charging station 1001. The exhaust system is turned on to enable CO2 off gas 1044 to vent through conduit 1050 and then to the exhaust system. Next, CO2 vapor valve 1094 is set in the open position (or verified to be in such open position), and control valve 1100 is configured into the open position to allow CO2 gas withdrawal from the CO2 source 1090 into the gas conduit 1091. CO2 source 1090 contains CO2 gas in the headspace at source pressure. Pressure regulator 1080

("PRV 1100") is adjusted to reduce the pressure of CO2 gas withdrawn from the CO2 source 1090 from source pressure to about 150 psig.

Gas conduit 1091 contains pressure transducers 1071 and 1070, and pressure indicator 1078, each of which is installed within the gas conduit 1091. Pressure transducer 1071 measures the pressure of the headspace in the CO2 source 1090; pressure indicator 1078 measures the pressure of the CO2 gas stream after reduced to about 150 psig; and pressure transducer 1070 measures the pressure of the CO2 stream entering the CO2 snow charger. As the CO2 gas flows through the various portions of the gas conduit 1091, any residuals and/or impurities are purged. The CO2 gas is directed into the container 1010, which at this point of the process 1000 does not contain any CO2 block 1099. The CO2 gas subsequently exits out from the transportable container 1010 through vent holes of the CO2 charger, as hereinbefore described. The purging process with the CO2 gas can continue for any amount of time. In one example, the purging process can continue for approximately 30 seconds.

After approximately 30 seconds have elapsed, and with the CO2 vapor valve 1094 remaining in the open position; and control valve 1100 remaining configured into the open position, liquid CO2 from the CO2 source 1090 can be introduced through liquid conduit 1092 and into container 1010, thereby beginning the generation of the in-situ CO2 block 1099 in accordance with principles of the present invention, as described hereinbefore. CO2 main liquid withdrawal valve 1093 is set to the open position or verified to be in such open position; and CO2 liquid control valve 1200 is set in the open position. Because the supply pressure of the liquid CO2 stream flowing in conduit 1092 (e.g., approximately 350 psig) is generally higher than that of the stream of CO2 gas flowing in gas conduit 1091 (e.g., approximately 150 psig), the CO2 gas remains in gas conduit 1091 and stops flowing into container 1010 during generation of CO2 block 1099 within container 1010. Check valve 1067 prevents the CO2 liquid stream pressure from causing backflow of the CO2 gas within gas conduit 1091 back into the CO2 source 1090.

When CO2 liquid enters charger and then into container 1010, the CO2 liquid undergoes a phase change to form CO2 snow block 1099 therein, and CO2 off-gas is generated and flows through vent holes of the CO2 snow charger. The CO2 off gas 1044 enters the interior of the charging station 1001. Exhaust system pulls the CO2 off gas 1044 through conduit 1050, thereby preventing concentration buildup of the CO2 off-gas within the charging station 1001 and surrounding environment of the charging station 1001. The flow of CO2 liquid continues for a certain amount of time. In one example, the liquid CO2 can enter the container 1010 for approximately 30 seconds during which time CO2 snow block 1099 is generated. After 30 seconds or so have elapsed, CO2 liquid control valve 1200 is configured into the closed position. When CO2 liquid control valve 1200 closes, there is substantially no supply pressure of the liquid CO2 stream in conduit 1092. As a result, the CO2 gas in gas conduit 1091 now has sufficient pressure (e.g., 150 psig) to flow into charger and then container 1010, which is at atmospheric pressure. The CO2 gas flows into the snow chamber of container 1010. As the CO2 gas flows into the snow chamber of container 1010 and then into the meshed tube, the snow block 1099 can become more compacted or packed than achievable solely from CO2 off gas generation in the continuous charging method. Thereafter, the CO2 gas flows through meshed tube and through vent holes of snow charger until entering the interior of the charging station 1001 as CO2 gas 1044. The CO2 gas is then exhausted through conduit 1050 and directed to the ventilation system.

With the alternation of CO2 gas purging and CO2 snow charging, the bulk density of the CO2 snow block 1099 can be higher than that formed in the continuous charging method. When the weight scale 1055 reaches a predetermined weight, liquid CO2 control valve 1200 is turned to the closed position followed by CO2 gas control valve 1100. In this manner, CO2 in-situ block 1099 is formed on-demand with improved packing density, which can translate into improved endurance during transport of the container 1010.

During process 1000, PLC 1085 is in electrical communication with pressure transducers 1070 and 1071; control valves 1100 and 1200; weigh scale 1055; access door sensor 1054; and exhaust/ventilation system. These electrical connections allow signal transmission and communicate on between the PLC 1085 and such components, thereby ensuring regulation and control of the process 1000.

Safety relief valves 1086 and 1087 ("SRV 1102 and SRV 1200") are designed to relieve residual pressure that may be trapped in the gas conduit 1091 and/or liquid conduit 1092, respectively, when the various system components of process 1000 are shut down. For example, when the system is shut down, control valve 1200 is closed and the main liquid withdrawal valve 1093 is also closed. Residual liquid CO2 may be trapped along the portion of liquid conduit 1092 extending from the control valve 1200 to the main liquid withdrawal valve 1093. As the trapped liquid CO2 therealong can eventually sublime into CO2 gas, the pressure buildup can be relieved by the safety relief valve 1087, which in one example is set to actuate at 400 psig. The safety relief valve 1086 also serves to relieve pressure if and when the pressure buildup in the CO2 gas 1091 conduit reaches 400 psig.

It should be understood that the various operating parameters stated herein are merely illustrative and can be varied as needed to be suitably tailored for the specific in-situ CO2 snow block generation within the transportable container 1010. It is further understood that different steps can be employed to achieve the same resultant process 1000 whereby introduction of liquid CO2 alternated with CO2 gas into the transportable container 1010 occurs to improve packing density of the resultant CO2 in-situ block 1099 within the transportable container 1010.

Still other modifications are contemplated by the present invention. For example, a process of cleaning or disinfecting can be incorporated into the present invention. In this regard, the container 2 of FIG. 1a and FIG. 6 may be configured to permit exposure of the interior of container 2 to a cleaning or disinfecting fluid. The meshed conduit 3 or product holder is removed during the cleaning or disinfecting process. In one embodiment a closure as known in the art may be placed in the container 2 with one or more conduits passing through the closure. The disinfectant or cleaning fluid can then then flow into the closure and fill the container. The fluid is held within the container for a target hold time. Alternatively, the closure may contain one or more additional conduits passing through the closure to permit flow of the cleaning or disinfecting fluid into the container 2 and exit flow from the container 2 for a target time. The container 2 may also be directly equipped with one or more ports to supply and remove the cleaning or disinfecting fluid. After completing the cleaning/disinfecting, the closure can be removed from the interior of the container 2.

Another embodiment of the present invention includes configuring each container 2 with a unique identifier that can be read electronically or physically for identifying certain aspects of the container 2 to be used for the charging process and subsequent transport of items stored therewithin to a destination site. By way of example, the unique identifier can be a barcode, Quick Response (QR) code or near field communication (NFC) tag which has embedded information that is unique to that particular container 2. Representative examples of embedded information in the barcode, QR code or NFC tag or other unique identifier of the container 2 may include container identification information such as, but not limited to, tare weight of the container; initial and real-time of weight of the snow block 10 charged in the container 2; endurance characteristic; type of container 2; time of charge into the container 2; date of charge into the container 2; destination of the container 2; the type of item(s) being transported in container 2, as well as other specific information about the item including, by way of example, the warmest temperature the item can be exposed to in the container 2 and the duration at such warmest temperature; and location traceability of the container 2. This type of container identification information embedded within the unique identifier can provide historical reference for that particular container 2, including the expected endurance of the container 2. The container identification information can be readable through a scanner, such as, by way of example, a QR scanner, barcode scanner or other means. In this manner the container identification information that is read or scanned can be stored in the cloud. Alternatively, a database such as a cloud database can be employed to maintain all necessary container identification information.

The identification and traceability of the container 2 during transportation to a destination site, together with the charging information, can be maintained and looked up by user as may be desired. In one example, when the unique identifier of the container 2 is being scanned, the container identification information that is read from the unique identifier can be linked, matched or cross-referenced with the samples or items loaded into the container 2 by a user.

In addition to container identification information, temperature data as well as other location and traceability information can be measured and recorded during transport of the container 2 with the items stored therewithin. For example, an internal temperature sensor may be located along or adjacent to the interior region of the cover of the container 2 (e.g., cover 600 of FIG. 6) to monitor a temperature inside the container 2. Such an internal temperature sensor may also allow the means to detect when the cover of the container 2 has been removed from the container 2. Alternatively, or in addition thereto, an external temperature sensor may be located along the exterior of the container 2 to measure the environmental temperature that is surrounding the container 2 at a particular instance. Such an external temperature sensor can detect when the container 2 has been exposed to an environmental temperature higher than expected, thereby allowing the distribution path of the container 2 to be altered if necessary, so as to avoid exposure to such higher-than-expected environmental temperatures. The ability to preserve the items stored within the container 2 is therefore enhanced. Still further, an additional temperature sensor may be installed within the interior of the container 2 to monitor the temperature of the space surrounding the item (i.e., the region of the product holder or meshed conduit 3).

By use of such temperature sensors, the temperature difference between the environmental temperature and the inside temperature of the container 2 can be used to more accurately estimate the endurance of the particular container 2. The temperature data can also be used to better simulate expected endurance characteristics of the container 2 at the facility where charging occurs; and snow block 10 consumption during transport of the container 2. In this manner, the reliability of the expected performance of the container 2 can be increased before deploying the container 2 to the user. Further, the historical behavior of the container 2 (e.g., snow block 10 consumption, average environmental temperature and average inside temperature of container 2) can be utilized to set alarms for any abnormal behavior and/or transit conditions of the container 2 detected during transport.

The temperature data as measured can be stored onto a data chip within the container 2; the temperature data as well as the other data that is tracked can subsequently be downloaded as needed when the container 2 arrives at its destination site, thereby allowing the user to access and use the data to potentially make certain decisions about the charging process along with selection of container 2; and/or better map the distribution routes of the container 2 from starting site to destination site.

Numerous means can be utilized to transfer the data, including a Universal Serial Bus (USB) connection or other suitable transfer means. Additionally, customized apps for smart phones can be developed to synchronize the temperature data and other information such as customer identification information through wireless connection means, including, by way of example, Bluetooth wireless connection means. Still further, a wireless telemetry device can be installed onto the container 2, so once the gateway is available, the generated information, including container identified information and measured data, can be transferred remotely to the gateway and into a sensor cloud through the cellular network, thereby enabling availability on a website and particular app. The present invention contemplates other suitable transfer means as currently known in the art or which may be subsequently developed to transfer the information (i) generated from a unique identifier of the container; (ii) measured; (iii) tracked; and/or (iv) stored during charging and transport of the container 2.

It should be understood that other sensors can be incorporated into the container 2. For example, one or more sensors can be configured onto the container 2 to enable location tracking of the container 2. The location tracking can be correlated to temperature data and tracking of specific activities, such as, by way of example, identifying which items are located within which containers 2. In this manner, real time information about the location of the container 2 and health of the items within container 2 is enabled, which allow the ability to take corrective action in real time to prevent damage to the items. Further, the container identification information along with the other information recorded and tracked during charging and/or transport can be utilized to estimate the amount of snow block 10 that has been consumed during the transportation. In another embodiment, the tracked information and container identified information can also be used by a user to re-charge a previously transported container that may or may not contain snow block 10. This information can be used to determine how much additional snow block 10 would be required in a charging process to impart additional use or life of the container 2 for subsequent transport of specific items to a particular destination site.

Further, the present invention has application in a variety of applications, including, but not limited to, the transport and preservation of biological samples; personal items; poultry and dairy.

Other variations to the in-situ charging systems of the present invention are contemplated without departing from the spirit and scope of the present invention. For example, a CO2 snow charger can be configured to extend through (i.e., penetrate) a meshed conduit and into the snow chamber of a container. Alternatively, the CO2 snow charger can be operably connected to the meshed conduit and oriented towards the snow chamber. Any of the CO2 snow chargers of the present invention can be used to carry out the in-situ charging of CO2 fluid through the meshed conduit. In one embodiment, the CO2 snow charger can be inserted through an opening of the container. The CO2 snow charger is then oriented to extend through the meshed conduit to enable supply of CO2 fluid through the CO2 snow charger and then into a snow chamber. CO2 fluid from a supply source is directed through the CO2 snow charger and emerges from a nozzle of the CO2 snow charger. The nozzle is oriented towards the snow chamber. When the CO2 fluid emerges from the nozzle, the CO2 fluid enters the snow chamber, but not the internal meshed conduit volume. The CO2 fluid undergoes a pressure and temperature drop when entering into the snow chamber to produce solid particles of CO2 snow block, and CO2 off-gas is created in the snow chamber. Solid particles of CO2 snow block accumulate within the snow chamber as CO2 fluid continues to be supplied through the CO2 snow charger. The off-gas flows out of the snow chamber through the pores of the meshed conduit, while the CO2 snow block remains within the snow chamber. A seal or partial seal (i.e., sealed connection) is created at the location where the CO2 snow charger operably connects to or penetrates through the meshed conduit. The sealed connection, in combination with the pores of the meshed conduit, restrict flow of the off-gas so as to maintain a positive pressure in the snow chamber during filling. An opening of the container is not sealed to enable the off-gas to flow from the meshed conduit through the opening of the container (e.g., vent to atmosphere when a lid of container is removed).

Other variations to the present invention are contemplated for achieving and maintaining effective segregation of an internal product storage volume from the snow chamber that are consistent with the principles of the present invention. For example, the snow chamber can be created within the internal meshed conduit volume. The internal meshed conduit volume effectively serves as the snow chamber to confine the CO2 snow block within the internal meshed conduit volume, thereby allowing one or more items to be placed within the balance of the internal volume of the container, which serves as the internal product storage volume. A CO2 charger operably connects to or extends through an opening of a container and its nozzle is preferably oriented into the internal meshed conduit volume. Any of the CO2 snow chargers of the present invention can be used to carry out the in-situ charging of CO2 fluid into the meshed conduit. A sealed connection is created at the location where the CO2 charger operably connects to or penetrates into the meshed conduit. The sealed connection, in combination with the pores of the meshed conduit, restrict the flow of the off-gas so as to maintain a positive pressure in the snow chamber during filling. CO2 fluid as described hereinbefore is introduced through the CO2 charger. A pressure and temperature drop occurs as the CO2 fluid emerges out from the nozzle of the CO2 charger and into the internal meshed conduit volume to produce solid particles of CO2 snow block and CO2 off-gas in the snow chamber. Solid particles of CO2 snow bock accumulate within the snow chamber and remain within the meshed conduit, as a result of the pores of the meshed conduit preventing the CO2 snow block from migrating into the internal product storage volume. The off-gas flows out of the snow chamber through the pores of the meshed conduit and into the internal product storage volume. An opening of the container is not sealed to enable the off-gas to flow from the internal product storage volume through the opening of the container (e.g., vent to atmosphere when a lid of the container is removed).

Consistent with the other embodiments described hereinbefore, the meshed conduit blocks passage of CO2 snow block through its pores, thereby achieving and maintaining effective segregation of the snow chamber within the internal meshed conduit volume that is spaced apart from the internal product storage volume. It should be understood the meshed conduit can be positioned in any orientation within the internal storage volume of the container. For example, the meshed conduit can be vertically oriented and centrally located within container. In another example, the meshed conduit can be horizontally oriented along a surface of the container.

It should be understood that the meshed conduit can be replaced or supplemented upon completion of charging CO2 fluid, with a substantially non-porous like structure that functions to partition the interior volume of the container into a sample volume and a CO2 snow or CO2 snow block volume.

The ability for the inventive CO2 snow-making kit to charge CO2 and generate CO2 snow block in-situ within a transportable container that exhibits sufficient temperature hold or endurance is demonstrated by the following tests.

Comparative Example 1 (Standard Shipper)

Figure 9:
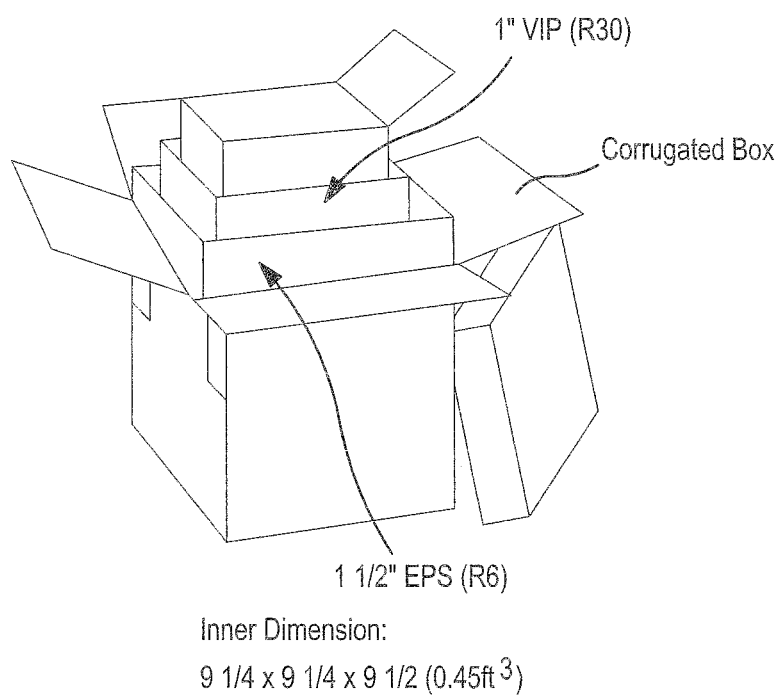
FIG. 9 shows a standard shipper box.

Commercially available CO2 dry ice pellets of 0.5 inch diameter were manually scooped and placed into a standard shipper box shown in FIG. 9. The standard shipper box is commercially available from Sonoco Thermosafe and consists of three layers of insulation, including an outer corrugated box, an expanded polystyrene insulation layer and a vacuum insulated panel. 0.5" dry ice pellets were placed within the inner most box. Thermocouples were placed near the top of the shipper box.

Figure 8:
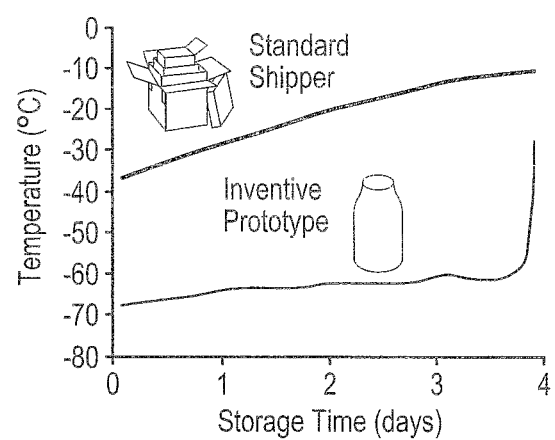
FIG. 8 shows the temperature profile comparisons for the inventive storage apparatus containing CO2 snow block prepared by the inventive methods, and a standard shipper filled with CO2 dry ice pellets.

Temperature measurements were obtained for almost 96 hours. The results are shown in FIG. 8. The temperature in the standard shipper gradually increased over the course of the test.

Example 1 (Invention)

In accordance with the principles of the present invention, a prototype kit as shown in FIG. 1a was fabricated and assembled to generate CO2 snow block. A cylindrical meshed tube was inserted and installed into the interior of a substantially cylindrical container. The container had an overall height of 19.4 inches (defined as the height spanning from the bottommost portion of the container 2 to the topmost portion of the container 2), a neck diameter of 3.58 inches and an overall diameter of 9.2 inches (defined as the widest portion of the container 2 from sidewall to sidewall). The total interior storage volume was about 6 liters with a top cover secured to the top of the container. The cylindrical meshed tube had a volume of about 1 liter.

A snow charger including a circular flow conduit network with multiple nozzles arranged along the periphery of the circular flow conduit network was connected to the top portion of the mesh tube. The central opening of the flow conduit network was then connected to a CO2 pipe which was attached to a liquid CO2 source.

Liquid CO2 was introduced from the liquid CO2 source with CO2 gas to ensure the pressure of the liquid CO2 did not fall below 150 psig, thereby avoiding premature solid CO2 formation in the pipe and/or the nozzles of the circular flow conduit network. Solid CO2 formation has the potential to clog the piping and/or nozzles.

CO2 snow particles and CO2 off-gas were produced in the container. The CO2 off-gas passed through the meshed tube and then exited the container. A negligible amount of CO2 snow particles was observed to pass into or form within the interior passageway of the meshed tube.

The charging continued until 10.5 lbs. of the CO2 snow particles accumulated in the container. The CO2 snow resembled an annular shape with the consistency of a substantial block form of tightly-held particles. The CO2 snow block visually appeared significantly denser than the typical consistency of conventional fluffy-like CO2 snow particles that are produced when pressurized liquid CO2 fluid is introduced into an empty container at ambient temperature and pressure conditions.

Next, the properties of the CO2 snow block were determined and compared against the properties of commercially available 0.5" diameter CO2 dry ice pellets. Bulk density was determined by calculating the ratio of the weight of CO2 snow block or dry ice pellets filled in the container to the volume of the space into which the CO2 snow block or dry ice pellets was filled. In this manner, the bulk density for the CO2 snow block produced by the charging methods of the present invention was determined to be 60.0 lb/ft3. Commercially available 0.5" diameter CO2 dry ice pellets were filled in the same volume as that of the container utilized to make the CO2 snow block. The CO2 dry ice pellets, which generally represent the standard for acquiring acceptable dry ice density, were determined to have a bulk density of 59.2 lb/ft3 when they are used in the prototype kit. These results indicate that the charging method of the present invention was capable of producing relatively high density CO2 snow block with bulk densities comparable or higher to the bulk densities of the CO2 dry ice pellets filled in the prototype kit.

Example 2 (Invention)

The temperature profile of the inventive prototype with CO2 snow block produced therein as described in Example 1 was evaluated and then compared with the temperature profile of the CO2 dry ice pellets contained in the standard shipper evaluated as described in Comparative Example 1.

The meshed tube and snow charger were removed from the container of the prototype kit. Thermocouples were then placed slightly below the bottom of the cover for the container. A top cover was placed onto the opening of the container.

Temperature measurements were obtained for almost 96 hours. The results indicated the prototype container with the CO2 snow block in-situ generated therein approached a temperature no warmer than −60° C. over 90 hrs. The results are shown in FIG. 8. The temperature at a given time represents an average of the temperature measurements obtained from the different thermocouples situated in the container. The temperature profile of the inventive prototype was held at a lower temperature for a longer period of time compared to that of the standard shipper box. Additionally, it was also observed that the inventive prototype kit had less temperature variation within its sample space than that of the standard shipper box.

Example 3 (Invention)

The effect of different R values on the performance of the prototype kit of the present invention was evaluated. As known in the art, the R value is measure of thermal resistance that is employed to quantify endurance, which is an indicator of the duration a certain item can be maintained within the container at a temperature no warmer than a certain pre-defined temperature. In the tests carried out herein, the pre-defined temperature not to exceed was −60° C. The same container as employed in Example 1 and Example 2 were used to carry out the tests. The container as manufactured initially was vacuum jacketed to a level of 1000 microns. The container included a vacuum port that allowed access to the vacuum insulated walls. A vacuum device was connected as necessary to the vacuum port to achieve different vacuum levels to evaluate the endurance.

In the first test, the endurance of the container at a vacuum insulated jacket of approximately 1000 microns was evaluated. CO2 snow block was produced in accordance with the charging methods of the present invention described in Example 1. Next, the temperature profile of the container was generated as described in Example 2. Temperatures were measured and the graphical results are designated "Inventive Prototype" as shown in FIG. 8. The data indicates that the sample space inside the container did not attain a temperature warmer than −60° C. for almost 4 days. Based on the temperature data, the R value for the shipper was calculated to be 18 $ft^2 hr° F./Btu$.

Figure 11:
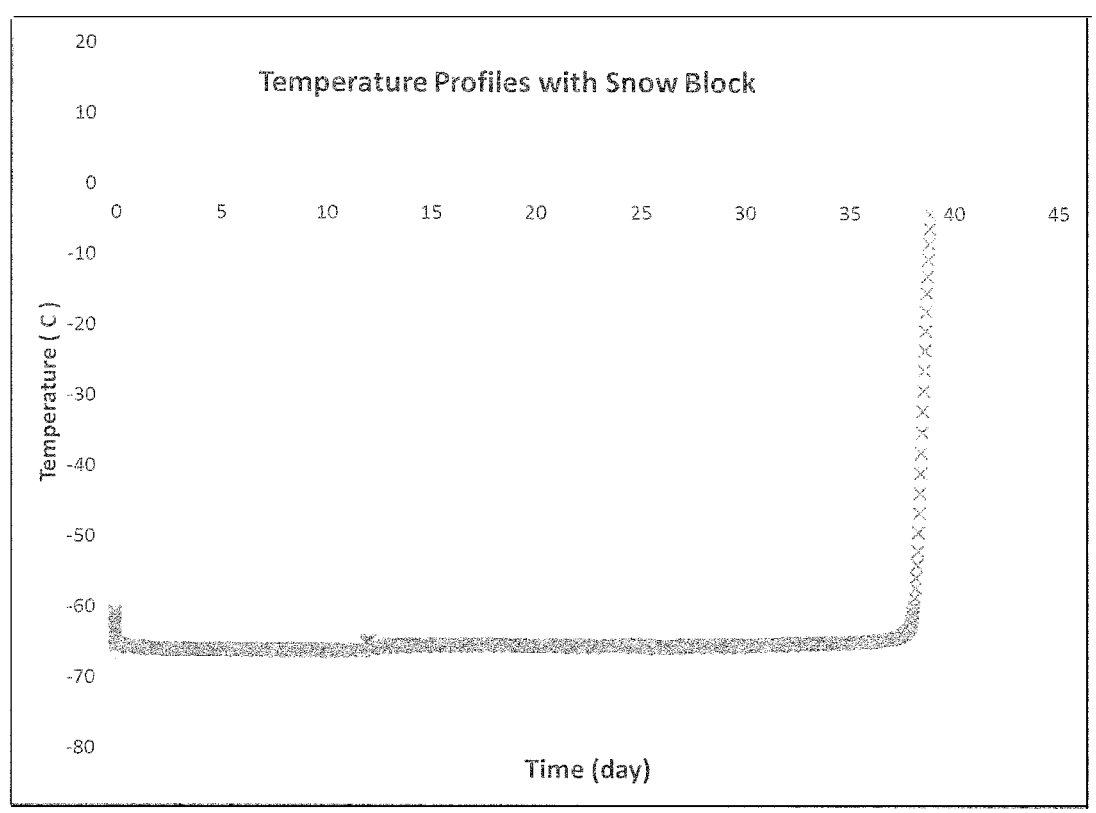
FIG. 11 shows a temperature profile for the inventive storage apparatus containing CO2 snow block charged into the container by the methods of the present invention, in which the walls of the container are vacuum insulated to a vacuum level of approximately 10 microns.

In a second test, a vacuum device was connected to the vacuum port to reduce the vacuum level in the jacket from 1000 microns to approximately 10 microns. CO2 snow block was produced in accordance with the charging methods of the present invention described in Example 1. Next, the temperature of the container was generated as described in Example 2. Temperatures were measured and the graphical results are designated "Inventive Prototype" as shown in FIG. 11. The data indicates that the storage space inside the container did not attain a temperature warmer than −60° C. for almost 37 days. As such, these tests indicate that the endurance of the container increased by a factor of greater than 9 when the vacuum level was increased by a factor of 100.

While it has been shown and described what is considered to be certain embodiments of the invention, it will, of course, be understood that various modifications and changes in form or detail can readily be made without departing from the spirit and scope of the invention. It is, therefore, intended that this invention is not limited to the exact form and detail herein shown and described, nor to anything less than the whole of the invention herein disclosed and hereinafter claimed.

The invention claimed is:

1. A carbon dioxide (CO2) snow-making kit for charging CO2 and generating CO2 snow block in-situ within a container, comprising:
   a container comprising an interior volume defined by an internal meshed conduit volume, and a snow chamber into which CO2 snow block is configured to be generated and stored, said interior volume further surrounded by multiple container walls;
   the internal meshed conduit volume configured to receive a meshed conduit;

said meshed conduit comprising porous openings sufficient for gas to pass through, but for the CO2 snow block to remain substantially within the snow chamber; and a CO2 snow charger operably or integrally connected to or penetrated through the meshed conduit, the CO2 snow charger configured to selectively direct CO2 fluid into the snow chamber, the snow charger further comprising one or more openings in fluid communication with the snow chamber.

2. The kit of claim 1, wherein the snow chamber solely occupies the internal meshed conduit volume.

3. The kit of claim 1, wherein the snow chamber at least partially surrounds the meshed conduit, and further wherein the CO2 snow charger connects to or extends through the meshed conduit such that a nozzle of the CO2 snow charger is oriented towards the snow chamber.

4. The kit of claim 1, wherein the CO2 snow charger creates a sealed connection with the meshed conduit but an unsealed connection with the container.

5. The kit of claim 1, wherein the container comprises an opening through which a portion of the CO2 snow charger extends, and through which gas can vent.

6. The kit of claim 1, wherein the interior volume of the container comprises an internal product storage volume, said internal product storage being separate and distinct from the snow chamber.

7. A method for in-situ charging carbon dioxide (CO2) snow block within a container, comprising the steps of:
supplying CO2 fluid into a CO2 snow charger operably or integrally connected to a meshed conduit, said mesh conduit located within an interior of the container;
selectively directing the CO2 fluid into a snow chamber;
generating in-situ CO2 snow particles and gas in the snow chamber; and
passing the gas through the meshed conduit.

8. The method of claim 7, further comprising the step of introducing the CO2 snow charger into an opening of the container without sealing the CO2 snow charger to the container.

9. The method of claim 7, further comprising packing the CO2 snow particles to form a substantially CO2 snow block.

10. The method of claim 7, further comprising accumulating the in-situ CO2 snow particles within the snow chamber without substantial migration or passage of the CO2 snow particles into an internal product storage volume.

11. The method of claim 7, further comprising generating information relating to the in-situ charging of CO2 snow particles, said information to be (i) incorporated into a unique identifier for the container; or (ii) transferred to a database.

12. A method for assembling a carbon dioxide (CO2) snow charging system at a site for in-situ generation of CO2 snow block in a container, comprising:
providing a CO2 source;
providing a container, the container further comprising an internal product volume and a snow chamber;
providing a meshed conduit;
inserting the meshed conduit into the container;
providing a CO2 snow charger;
operably connecting or penetrating a first end of the CO2 snow charger to or through the meshed conduit;
configuring the CO2 snow charger to direct CO2 fluid into the snow chamber, but not the internal product volume; and
operably connecting a second end of the CO2 snow charger to the CO2 source.

13. The method of claim 12, further comprising operably connecting the first end of the CO2 snow charger to the meshed conduit without creating a sealed connection to the container.

14. A carbon dioxide (CO2) snow charger system adapted to produce CO2 snow block in a snow chamber, comprising:
a meshed conduit, said meshed conduit comprising porous openings sufficient for CO2 off-gas to pass through the porous openings, but substantially block particles of the CO2 snow block; and
a CO2 snow charger operably or integrally connected to or penetrated through the meshed conduit, said CO2 snow charger configured to selectively direct CO2 fluid into the snow chamber.

15. The snow charger system of claim 14, wherein a nozzle of the CO2 snow charger is oriented towards an internal meshed conduit volume.

16. The snow charger system of claim 14, wherein a nozzle of the CO2 snow charger is oriented away from an internal meshed conduit volume.

17. An apparatus configured for storing, preserving or transporting one or more items, comprising:
a container characterized by an interior volume comprising a first region and a second region, wherein the first region is an internal product storage volume, and the second region is a snow chamber into which CO2 snow is stored, said container further comprising multiple insulated container walls at least partially surrounding the first region and the second region;
a meshed conduit or a product holder located within the interior container volume;
wherein substantially all of the CO2 snow is adapted to occupy the snow chamber, whereby said CO2 snow is confined within the snow chamber;
the internal product storage volume separate and distinct from said snow chamber, the internal product storage volume adapted to receive one or more items for storage, preservation and/or transport.

18. The apparatus of claim 17, wherein the snow chamber is located within the meshed conduit or the product holder.

19. The apparatus of claim 17, wherein the interior volume of the container consists essentially of a snow chamber and an internal product storage volume.

20. The apparatus of claim 17, wherein the snow chamber is situated external to the internal product storage volume, said internal product storage volume located within the meshed conduit or the product holder.

21. The apparatus of claim 17, further comprising a unique identifier that is configured to embed container identification information therein, said container identification information retrievable by reading said unique identifier.

22. The apparatus of claim 17, said walls comprising a getter material locating therewithin, wherein said getter material maintains a vacuum and an insulation level and is suitably compatible with said CO2 snow.

23. The apparatus of claim 17, further wherein the snow chamber is characterized by an absence of a foam-filled material or absorbent.

* * * * *